United States Patent
Smith et al.

(10) Patent No.: US 10,136,700 B2
(45) Date of Patent: Nov. 27, 2018

(54) ARTICLE OF FOOTWEAR WITH FLUID-FILLED CHAMBER LACKING AN INFLATION CHANNEL AND METHOD FOR MAKING THE SAME

(71) Applicant: NIKE, Inc., Beaverton, OR (US)

(72) Inventors: David G. Smith, Shanghai (CN); Stuart C. Forstrom, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 351 days.

(21) Appl. No.: 15/177,402

(22) Filed: Jun. 9, 2016

(65) Prior Publication Data

US 2016/0278480 A1    Sep. 29, 2016

Related U.S. Application Data

(62) Division of application No. 13/722,153, filed on Dec. 20, 2012, now Pat. No. 9,380,832.

(51) Int. Cl.
*B29D 35/12* (2010.01)
*A43B 13/18* (2006.01)
(Continued)

(52) U.S. Cl.
CPC ............ *A43B 13/181* (2013.01); *A43B 13/12* (2013.01); *A43B 13/189* (2013.01); *A43B 13/20* (2013.01);
(Continued)

(58) Field of Classification Search
None
See application file for complete search history.

(56) References Cited

U.S. PATENT DOCUMENTS 2,677,906 A    5/1954    Reed
2,703,770 A    3/1955    Melzer
(Continued)

FOREIGN PATENT DOCUMENTS

WO    WO-0170060 A2    9/2001

OTHER PUBLICATIONS

International Searching Authority, International Search Report and Written Opinion for PCT Application No. PCT/US2013/076401, dated May 30, 2014.

*Primary Examiner* — Jeffrey H Aftergut
(74) *Attorney, Agent, or Firm* — Honigman Miller Schwartz and Cohn LLP; Matthew H. Szalach; Jonathan P. O'Brien

(57) ABSTRACT

An article of footwear is provided having a pressurized fluid-filled chamber in the sole structure having a continuous perimeter weld and lacking an inflation channel. The chamber may be formed from opposing polymer sheets, a continuous perimeter weld lacking a weld channel bonding the sheets and forming an interior void between the sheets, and a fluid disposed within the interior void exerting outward pressure on the sheets. A method for making the chamber can include placing a pair of polymer sheets in an opposing arrangement, pressing opposing perimeter weld portions of the sheets against each other to form an airtight seal along a perimeter region of an interior void, supplying a flow of pressurized air between the opposing sheets into the interior void, and, while maintaining a desired fluid pressure, welding the perimeter weld portions of the sheets to each other. A high-frequency welder for forming chamber is also provided.

20 Claims, 22 Drawing Sheets

(51) Int. Cl.
 *B29C 65/08* (2006.01)
 *A43B 13/20* (2006.01)
 *A43B 13/12* (2006.01)

(52) U.S. Cl.
 CPC ............ *B29C 65/08* (2013.01); *B29D 35/122* (2013.01); *B29D 35/128* (2013.01)

(56) References Cited

U.S. PATENT DOCUMENTS

| | | |
|---|---|---|
| 3,030,640 A | 4/1962 | Gosman |
| 3,608,215 A | 9/1971 | Fukuoka |
| 3,685,176 A | 8/1972 | Rudy |
| 3,758,964 A | 9/1973 | Nishimura |
| 4,187,620 A | 2/1980 | Selner |
| 4,217,705 A | 8/1980 | Donzis |
| 4,358,902 A | 11/1982 | Cole et al. |
| 4,506,460 A | 3/1985 | Rudy |
| 4,547,919 A | 10/1985 | Wang |
| 4,698,864 A | 10/1987 | Graebe |
| 4,722,131 A | 2/1988 | Huang |
| 4,782,602 A | 11/1988 | Lakic |
| 4,803,029 A | 2/1989 | Iversen et al. |
| 4,817,304 A | 4/1989 | Parker et al. |
| 4,823,482 A | 4/1989 | Lakic |
| 4,845,861 A | 7/1989 | Moumdjian |
| 4,874,640 A | 10/1989 | Donzis |
| 4,891,855 A | 1/1990 | Cheng-Chung |
| 4,906,502 A | 3/1990 | Rudy |
| 4,912,861 A | 4/1990 | Huang |
| 4,991,317 A | 2/1991 | Lakic |
| 4,999,931 A | 3/1991 | Vermeulen |
| 5,022,109 A | 6/1991 | Pekar |
| 5,025,575 A | 6/1991 | Lakic |
| 5,042,176 A | 8/1991 | Rudy |
| 5,044,030 A | 9/1991 | Balaton |
| 5,158,767 A | 10/1992 | Cohen et al. |
| 5,179,792 A | 1/1993 | Brantingham |
| 5,193,246 A | 3/1993 | Huang |
| 5,199,191 A | 4/1993 | Moumdjian |
| 5,224,277 A | 7/1993 | Sang Do |
| 5,224,278 A | 7/1993 | Jeon |
| 5,228,156 A | 7/1993 | Wang |
| 5,235,715 A | 8/1993 | Donzis |
| 5,245,766 A | 9/1993 | Warren |
| 5,253,435 A | 10/1993 | Auger et al. |
| 5,257,470 A | 11/1993 | Auger et al. |
| 5,335,382 A | 8/1994 | Huang |
| 5,337,492 A | 8/1994 | Anderie et al. |
| 5,353,459 A | 10/1994 | Potter et al. |
| 5,367,791 A | 11/1994 | Gross et al. |
| 5,406,719 A | 4/1995 | Potter |
| 5,493,792 A | 2/1996 | Bates et al. |
| 5,572,804 A | 11/1996 | Skaja et al. |
| 5,592,706 A | 1/1997 | Pearce |
| 5,595,004 A | 1/1997 | Lyden et al. |
| 5,669,161 A | 9/1997 | Huang |
| 5,686,167 A | 11/1997 | Rudy |
| 5,704,137 A | 1/1998 | Dean et al. |
| 5,741,568 A | 4/1998 | Rudy |
| 5,755,001 A | 5/1998 | Potter et al. |
| 5,771,606 A | 6/1998 | Litchfield et al. |
| 5,832,630 A | 11/1998 | Potter |
| 5,846,063 A | 12/1998 | Lakic |
| 5,907,911 A | 6/1999 | Huang |
| 5,916,664 A | 6/1999 | Rudy |
| 5,925,306 A | 7/1999 | Huang |
| 5,952,065 A | 9/1999 | Mitchell et al. |
| 5,976,451 A | 11/1999 | Skaja et al. |
| 5,979,078 A | 11/1999 | McLaughlin |
| 5,993,585 A | 11/1999 | Goodwin et al. |
| 6,009,637 A | 1/2000 | Pavone |
| 6,013,340 A | 1/2000 | Bonk et al. |
| 6,027,683 A | 2/2000 | Huang |
| 6,029,962 A | 2/2000 | Shorten et al. |
| 6,065,150 A | 5/2000 | Huang |
| 6,098,313 A | 8/2000 | Skaja |
| 6,119,371 A | 9/2000 | Goodwin et al. |
| 6,127,010 A | 10/2000 | Rudy |
| 6,128,837 A | 10/2000 | Huang |
| 6,192,606 B1 | 2/2001 | Pavone |
| 6,253,466 B1 | 7/2001 | Harmon-Weiss et al. |
| 6,258,421 B1 | 7/2001 | Potter |
| 6,374,514 B1 | 4/2002 | Swigart |
| 6,385,864 B1 | 5/2002 | Sell, Jr. et al. |
| 6,402,879 B1 | 6/2002 | Tawney et al. |
| 6,430,843 B1 | 8/2002 | Potter et al. |
| 6,457,262 B1 | 10/2002 | Swigart |
| 6,463,612 B1 | 10/2002 | Potter |
| 6,550,085 B2 | 4/2003 | Roux |
| 6,571,490 B2 | 6/2003 | Tawney et al. |
| 6,665,958 B2 | 12/2003 | Goodwin |
| 6,783,184 B2 | 8/2004 | DiBattista et al. |
| 6,796,056 B2 | 9/2004 | Swigart |
| 6,837,951 B2 | 1/2005 | Rapaport |
| 6,892,477 B2 | 5/2005 | Potter et al. |
| 6,918,198 B2 | 7/2005 | Chi |
| 6,931,764 B2 | 8/2005 | Swigart et al. |
| 6,971,193 B1 | 12/2005 | Potter et al. |
| 7,000,335 B2 | 2/2006 | Swigart et al. |
| 7,051,456 B2 | 5/2006 | Swigart et al. |
| 7,070,845 B2 | 7/2006 | Thomas et al. |
| 7,076,891 B2 | 7/2006 | Goodwin |
| 7,086,179 B2 | 8/2006 | Dojan et al. |
| 7,128,796 B2 | 10/2006 | Hensley et al. |
| 7,131,218 B2 | 11/2006 | Schindler |
| 7,141,131 B2 | 11/2006 | Foxen et al. |
| 7,200,957 B2 | 4/2007 | Hubbard et al. |
| 7,244,483 B2 | 7/2007 | Tawney et al. |
| 7,451,554 B2 | 11/2008 | Hazenberg et al. |
| 7,555,848 B2 | 7/2009 | Aveni et al. |
| 7,555,851 B2 | 7/2009 | Hazenberg et al. |
| 2003/0098118 A1 | 5/2003 | Rapaport |
| 2003/0148052 A1 | 8/2003 | Bonk et al. |
| 2008/0276490 A1 | 11/2008 | Holt et al. |
| 2009/0151195 A1 | 6/2009 | Forstrom et al. |

ARTICLE OF FOOTWEAR WITH FLUID-FILLED CHAMBER LACKING AN INFLATION CHANNEL AND METHOD FOR MAKING THE SAME

CROSS REFERENCE TO RELATED APPLICATIONS

This application is a Divisional of U.S. patent application Ser. No. 13/722,153, filed Dec. 20, 2012, the entire contents of which are hereby incorporated by reference.

BACKGROUND

Conventional articles of athletic footwear include two primary elements: an upper and a sole structure. The upper is generally formed from a plurality of elements (e.g., textiles, foam, leather, synthetic leather) that are stitched or adhesively bonded together to form an interior void for securely and comfortably receiving a foot. The sole structure is secured to a lower portion of the upper and is generally positioned between the foot and the ground. In addition to attenuating ground reaction forces (i.e., providing cushioning) during walking, running, and other ambulatory activities, the sole structure can influence foot motions (e.g., by resisting pronation), impart stability, and provide traction, for example. Accordingly, the upper and the sole structure operate cooperatively to provide a comfortable structure that is suited for a wide variety of athletic activities.

The sole structure incorporates multiple layers that are conventionally referred to as a sockliner, a midsole, and an outsole. The sockliner is a thin, compressible member located within the void of the upper and adjacent to a plantar (i.e., lower) surface of the foot to enhance comfort. The midsole is secured to the upper and forms a middle layer of the sole structure that attenuates ground reaction forces during walking, running, or other ambulatory activities. The outsole forms a ground-contacting element of the footwear and is usually fashioned from a durable and wear-resistant rubber material that includes texturing to impart traction.

The primary material forming many conventional midsoles is a polymer foam, such as polyurethane or ethylvinylacetate. In some articles of footwear, the midsole can also incorporate one or more thin plates to reinforce the midsole. In some articles of footwear, the midsole can further incorporate a sealed and fluid-filled chamber that increases the durability of the footwear and enhances ground reaction force attenuation of the sole structure. The fluid-filled chamber can be at least partially encapsulated within the polymer foam, as in U.S. Pat. No. 5,755,001 to Potter, et al., U.S. Pat. No. 6,837,951 to Rapaport, and U.S. Pat. No. 7,132,032 to Tawney, et al.

In other footwear configurations, the fluid-filled chamber can substantially replace the polymer foam, as in U.S. Pat. No. 7,086,180 to Dojan, et al. In general, the fluid-filled chambers are formed from an elastomeric polymer material that is sealed and pressurized, but can also be substantially unpressurized. In some configurations, textile or foam tensile members can be located within the chamber or reinforcing structures can be bonded to an exterior surface of the chamber to impart shape to or retain an intended shape of the chamber.

SUMMARY

An article of footwear having a pressurized fluid-filled chamber incorporated in the sole structure that lacks an inflation channel can provide various advantageous features, such as a uniform perimeter weld, improved integration with the sole structure and efficient manufacturability of the fluid-filled chamber. Many of these advantageous features can be enhanced, and additional advantageous features provided, through various options such as the use of monolayer films or multi-layer coextruded films and differing arrangements including fluid types, fluid pressures and chamber configurations.

In one configuration, an article of footwear has an upper and a sole structure secured to the upper and having a midsole, an outsole, and a fluid-filled chamber embedded within the midsole. The fluid-filled chamber can include a first flexible polymer sheet, a second flexible polymer sheet, a continuous perimeter weld lacking an inflation channel bonding the sheets and forming an interior void between the sheets, and a fluid disposed within the interior void exerting outward pressure on the sheets. The continuous perimeter weld can have a continuous cross-sectional area along its length. The fluid-filled chamber can also include a gate region through which fluid flows to fill the chamber when forming the chamber, and that is integrated in the perimeter weld after the chamber is filled and while welding the sheets to each other.

A method for making a fluid-filled chamber having a continuous perimeter weld and lacking an inflation channel can include placing a pair of polymer sheets in an opposing arrangement, pressing opposing perimeter weld portions of the sheets against each other to form an airtight seal along a perimeter region of an interior void, supplying a flow of fluid between the opposing sheets into the interior void to provide a fluid pressure, and, while maintaining the fluid pressure, welding the perimeter weld portions of the sheets to each other to form an uninterrupted perimeter weld around the chamber lacking an inflation channel. The method can further include unsealing an inflation region of the perimeter weld portions of the sheets to permit the fluid flow through an inflation gap in the inflation region formed between the sheets leading into the interior void.

A high-frequency welder apparatus for forming a fluid-filled chamber lacking an inflation channel in a single stage can include a cavity weld structure having a cavity surface formed therein including a cavity raised perimeter weld portion and a cavity recessed central portion disposed within the cavity raised perimeter weld portion, a core weld structure opposing the cavity weld structure having a core surface including a core perimeter weld portion and a core central portion disposed within the core perimeter weld portion, and a movable gate valve disposed proximate the perimeter weld portion on one of the cavity and core weld structures. The movable gate valve can be configured to withdraw a gate region of the perimeter weld portion surface on the one of the cavity and core weld structures selectively between an open and closed position to permit a temporary inflation channel to form between the first and second polymer sheets during an inflation and welding process. One of the cavity and core weld structures can be movable to move the cavity and core weld structures selectively toward and away from each other, and the cavity and core weld structures can each be configured to receive a polymer sheet on the cavity and core surfaces, press portions of the polymer sheets on the cavity and core raised perimeter weld portions against each other, and weld portions of the polymer sheet on the cavity and core raised perimeter weld portions to each other while a cavity formed between the sheets proximate the cavity and core central portions contains a pressurized fluid.

Advantages and features of novelty characterizing aspects of the invention are pointed out with particularity in the appended claims. To gain an improved understanding of advantages and features of novelty, however, reference can be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

Figure 1:
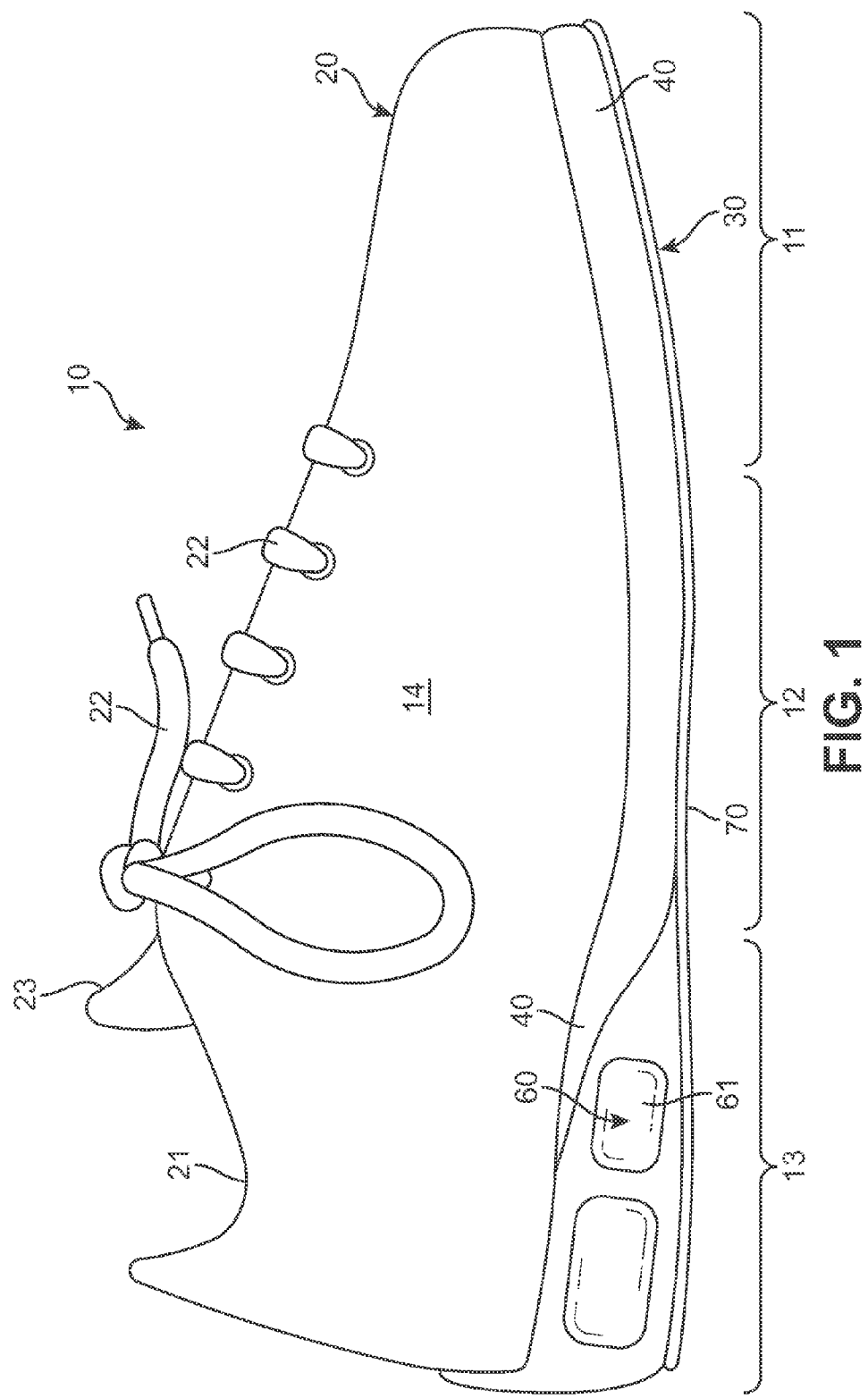
FIG. 1 is a lateral side view of an article of footwear having a sole structure that includes a fluid-filled chamber lacking an inflation channel.

The following discussion and accompanying figures disclose aspects and features pertaining to fluid-filled chambers and methods for making and/or using the same in the context of configurations of example fluid-filled chambers. It is understood that the fluid-filled chambers can be incorporated into various articles and devices, such as articles of apparel, containers including storage and transportation containers, articles of footwear, etc. and that aspects and features pertaining to the same can apply to a variety of articles and devices. For example, aspects and features pertaining to fluid-filled chambers and related methods discussed herein can be applicable for articles of apparel, such as clothing articles or articles of footwear; personal containers such as backpacks or luggage; sports containers for carrying and/or storing sports equipment, such as golf bags for carrying golf clubs or hockey bags for carrying hockey equipment; articles of footwear; welder devices and other equipment for forming the fluid-filled chambers; and methods for making the same. Example configurations and related concepts pertaining to the fluid-filled chambers are generally disclosed herein with reference to example footwear configurations that are suitable for common uses including walking, running and general athletic activities. The following discussion and accompanying set of figures (FIGS. 1 and 2) disclose a fluid-filled chamber incorporated in an exemplary article of footwear having a sole structure that includes, for example, a midsole element, one or more fluid-filled chambers, and an outsole.

The article of footwear is disclosed as having a general configuration suitable for running. Concepts associated with the footwear can also be applied to a variety of other athletic footwear types, including baseball shoes, basketball shoes, cross-training shoes, cycling shoes, football shoes, golf shoes, tennis shoes, soccer shoes, walking shoes, and hiking shoes and boots, for example. The concepts can also be applied to footwear types that are generally considered to be non-athletic, including dress shoes, loafers, sandals, and work boots. Accordingly, the concepts disclosed herein apply to a wide variety of footwear types.

Various features shown in the figures and noted herein may be referred to using directional adjectives such as top, bottom, right, left, up, down, medial, lateral, etc. These descriptions referring to the orientation of the article of footwear or its features as illustrated in the drawings are for convenience and clarity, and should not be interpreted as limiting the scope in any way. Generally, however, for convenience and clarity, articles of footwear and their features are described in the orientation typically encountered when worn by a user standing on the ground unless otherwise noted. It is understood that directional adjectives will change if the article of footwear and/or related features are viewed from a different orientation than as pictured or typically worn by the user.

Footwear Structure

Figure 2:
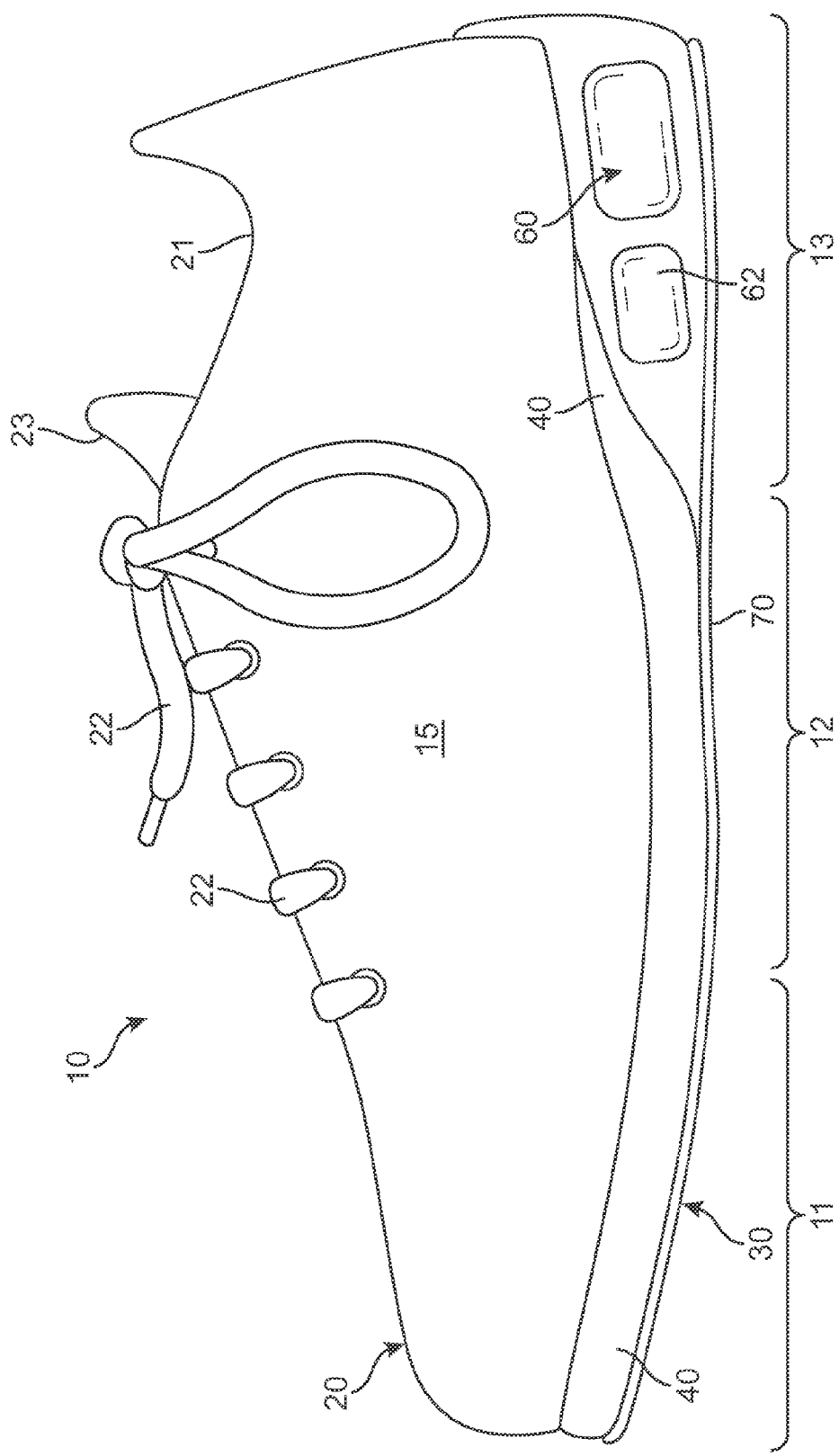
FIG. 2 is medial side view of the article of footwear of FIG. 1.
Figure 3:
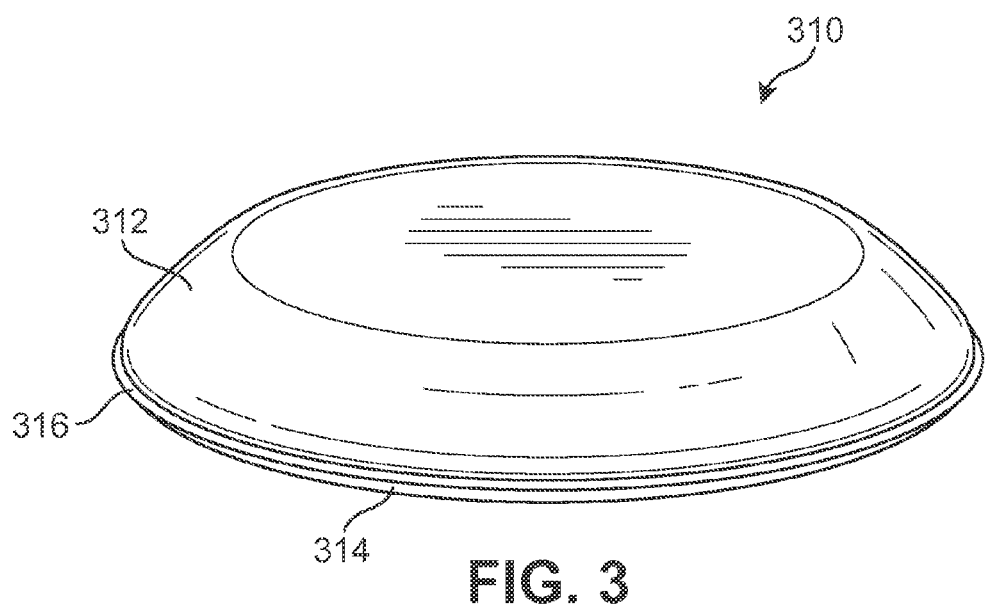
FIG. 3 is a perspective view of an example configuration of a fluid-filled chamber having a continuous perimeter weld and lacking an inflation channel.
Figure 4:
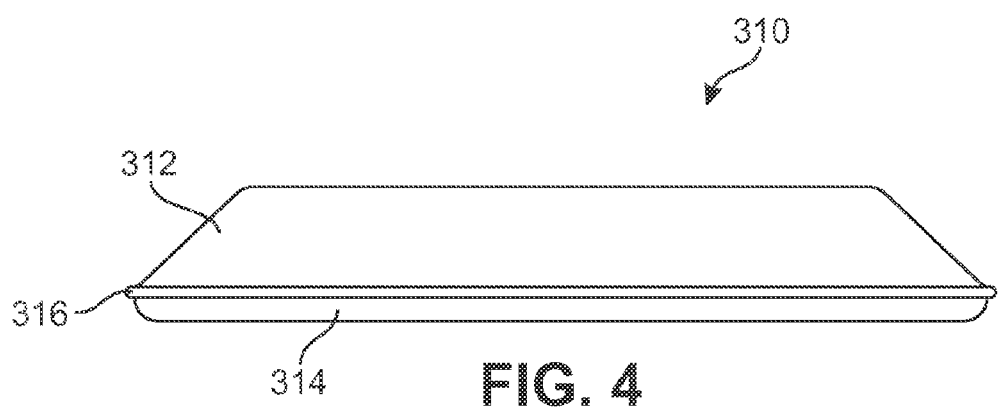
FIG. 4 is a side view of the fluid-filled chamber of FIG. 3.
Figure 5:
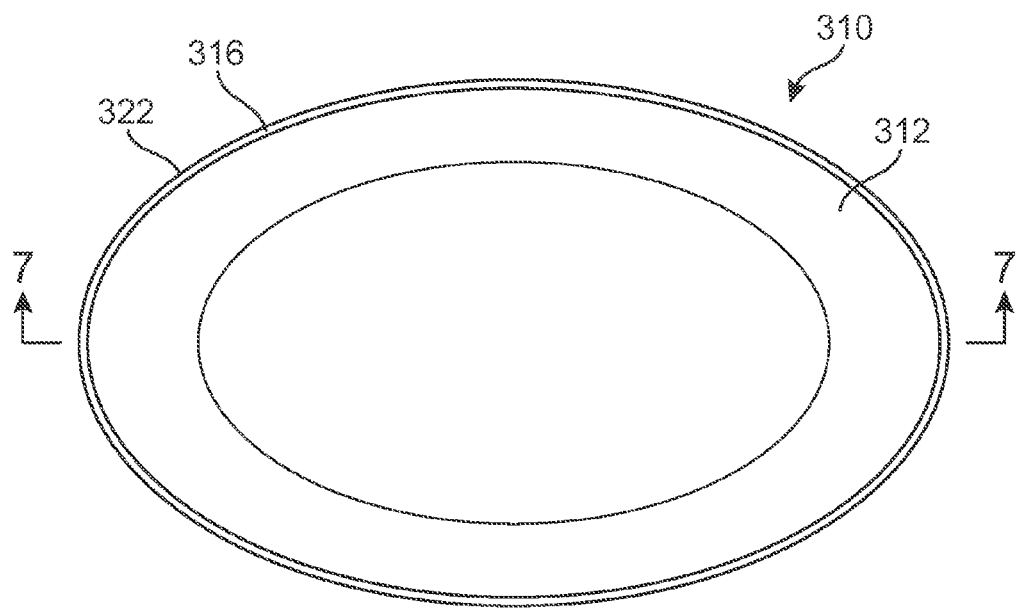
FIG. 5 is a top view of the fluid-filled chamber of FIG. 3.
Figure 6:
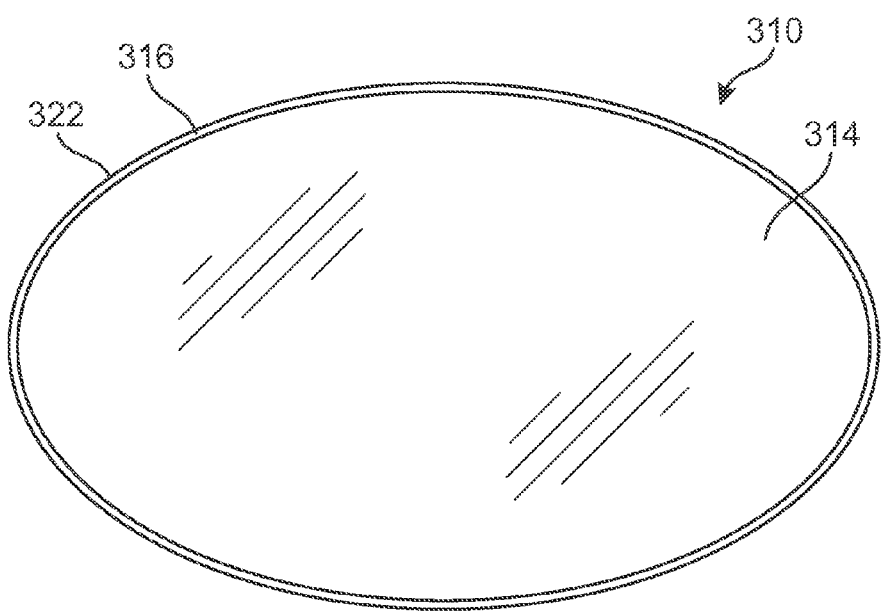
FIG. 6 is a bottom view of the fluid-filled chamber of FIG. 3.
Figure 7:
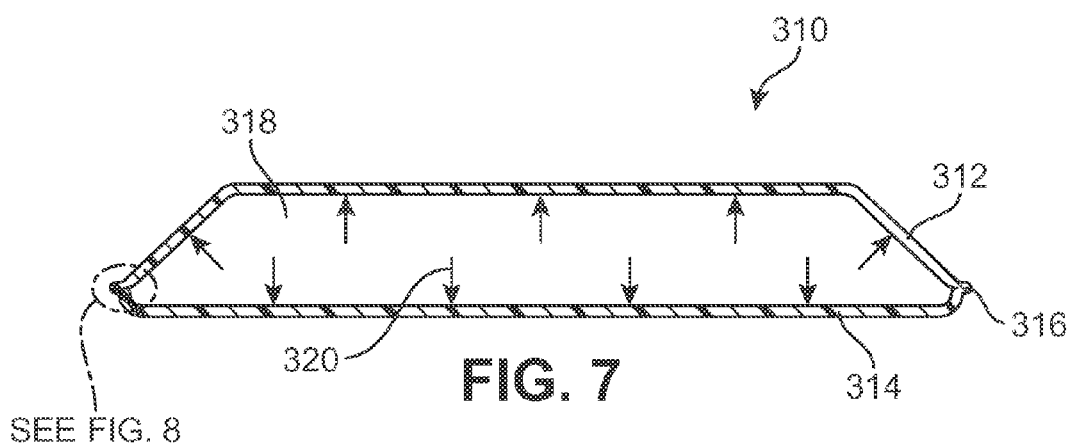
FIG. 7 is a cross-sectional view of the fluid-filled chamber of FIG. 3 taken along Line 7-7 shown in FIG. 5.
Figure 8:
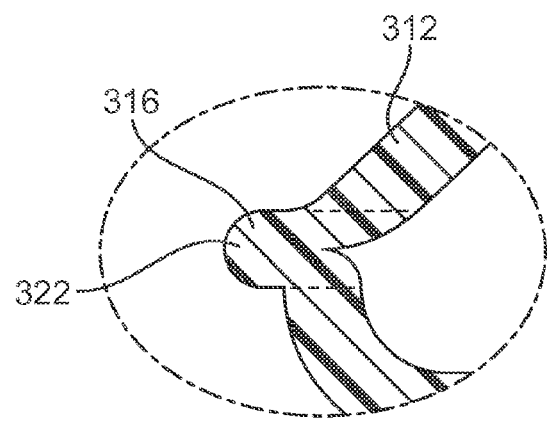
FIG. 8 is a close view of a cross-section of the perimeter weld of the fluid-filled chamber of FIG. 3 as identified in FIG. 7.

An article of footwear 10 is depicted in FIGS. 1 and 2 as including an upper 20 and a sole structure 30. For reference purposes, footwear 10 can be divided into three general regions: a forefoot region 11, a midfoot region 12, and a heel region 13. Forefoot region 11 generally includes portions of footwear 10 corresponding with the toes and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which extend through each of regions 11-13 and correspond with opposite sides of footwear 10. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 can also be applied to upper 20, sole structure 30, and individual elements thereof.

Upper 20 is depicted as having a substantially conventional configuration incorporating a plurality of material elements (e.g., textiles, foam, leather, and synthetic leather) that are stitched or adhesively bonded together to form an interior void for securely and comfortably receiving a foot. The material elements can be selected and located with respect to upper 20 in order to selectively impart properties of durability, air-permeability, wear-resistance, flexibility, and comfort, for example. An ankle opening 21 in heel region 13 can provide access to the interior void. In addition, upper 20 can include a lace 22 that is utilized in a conventional manner to modify the dimensions of the interior void, thereby securing the foot within the interior void and facilitating entry and removal of the foot from the interior void. Lace 22 can extend through apertures in upper 20, and a tongue portion 23 of upper 20 can extend between the interior void and lace 22. Given that various aspects of the present discussion primarily relate to sole structure 30, upper 20 can exhibit the general configuration discussed above or the general configuration of practically any other conventional or nonconventional upper. Accordingly, the overall structure of upper 20 can vary significantly.

Sole structure 30 is secured to upper 20 and has a configuration that extends between upper 20 and the ground. In addition to attenuating ground reaction forces (i.e., cushioning the foot), sole structure 30 can provide traction, impart stability, and limit various foot motions, such as pronation. The primary elements of sole structure 30 are a midsole element 40, one or more fluid-filled chambers 60, and an outsole 70. Each of these elements will be discussed in greater detail below.

Midsole element 40 is secured to a lower area of upper 20 (e.g., through stitching, adhesive bonding, or thermal bonding) and extends through each of regions 11-13 and between sides 14 and 15. Portions of midsole element 40 are exposed around the periphery of sole structure 30, but can also be covered by other elements, such as material layers from upper 20. Midsole element 40 is primarily formed from a foamed polymer material, such as polyurethane or ethylvinylacetate, which operates to attenuate ground reaction forces as sole structure 30 contacts and is compressed against the ground during walking, running, or other ambulatory activities.

Fluid-filled chamber 60 has the general configuration of a chamber formed from a polymer material that encloses a fluid (e.g., a gas, liquid, or gel). Although the fluid within chamber 60 may be referred to as pressurized, the fluid can be substantially at atmospheric pressure (i.e., zero gauge pressure) at ambient conditions. Chamber 60 can be incorporated within the midsole and lower areas of chamber 60 and can be positioned adjacent and secured to outsole 70. Further, as shown in FIGS. 1-2, portions of sidewalls or peripheral surfaces 61 and 62 of fluid-filled chamber 60 can be exposed to an exterior of footwear 10, at one or more locations between forefoot region 11 and heel region 13, and on lateral side 14, medial side 15, or both.

As examples, fluid-filled chamber 60 can incorporate various features or exhibit the general configurations of fluid-filled chambers disclosed in U.S. Pat. No. 7,556,846 to Dojan, et al.; U.S. Pat. No. 7,243,443 to Swigart; U.S. Pat. No. 6,571,490 to Tawney, et al.; U.S. Pat. No. 7,131,218 to Schindler; U.S. Patent Application Publication 2008/0276490 to Holt, et al.; and U.S. Patent Application Publication 2009/0151196 to Schindler, et al. A wide range of polymer materials can be utilized for forming chamber 60.

In selecting a material for chamber 60, the ability of the material to prevent the diffusion of the fluid contained by chamber 60 can be considered, as well as the engineering properties of the material (e.g., tensile strength, stretch properties, fatigue characteristics, dynamic modulus, and loss tangent). When formed from a polymer material, chamber 60 can have a thickness of approximately 1.0 millimeter, but the thickness can range from 0.25 to 4.0 millimeters or more, for example, depending upon the specific polymer material utilized. Examples of thermoplastic polymer materials that can be suitable for chamber 60 include urethane, polyurethane, polyester, polyester polyurethane, and polyether polyurethane. Various thermoset polymer materials can also be utilized for chamber 60. More specific examples of materials that can be utilized for chamber 60 include the various materials disclosed in any of the following: (a) U.S. Pat. Nos. 4,183,156, 4,219,945, 4,936,029, and 5,042,176 to Rudy; (b) U.S. Pat. Nos. 5,713,141 and 5,952,065 to Mitchell, et al.; and (c) U.S. Pat. Nos. 6,013,340, 6,082,025, 6,127,026, 6,203,868, and 6,321,465 to Bonk, et al.

The fluid within chamber 60 can be pressurized to a common pressure. In some configurations, chamber 60 can enclose fluids pressurized between zero and three-hundred-fifty kilopascals (i.e., approximately fifty-one pounds per square inch) or more. In addition to air and nitrogen, the fluid contained by chamber 60 can include octafluoropropane or be any of the gasses disclosed in U.S. Pat. No. 4,340,626 to Rudy, such as hexafluoroethane and sulfur hexafluoride, for example. Outsole 70 can be secured to lower surface regions of chamber 60 and can be formed from a textured, durable, and wear-resistant material (e.g., rubber) that forms the ground-contacting portion of footwear 10. Various adhesives, thermal bonding techniques, or mechanical systems can be utilized to secure outsole 70 to chamber 60.

When the foot is located within upper 20, midsole element 40, chamber 60, and outsole 70 extend under the foot in order to attenuate ground reaction forces, provide traction, impart stability, and limit various foot motions. More particularly, the foamed polymer material of midsole element 40 and fluid-filled aspects of chamber 60 compress, flex or otherwise deform upon the application of forces from the foot to attenuate ground reaction forces. Outsole 70 also has a durable and wear-resistant configuration that imparts traction. Accordingly, the various elements of sole structure 30 operate cooperatively to provide various advantages to footwear 10.

A variety of techniques can be utilized to manufacture sole structure 30. As an example, a mold can be utilized to form midsole element 40 and embed fluid-filled chamber 60 within midsole element 40. Outsole 70 can then be secured to midsole element 40 including fluid-filled chamber 60.

Example Fluid-Filled Chamber Configuration

Referring now to FIGS. 3-8, an additional configuration of a fluid-filled chamber 310 is shown that generally include the aspects and preferences discussed above along with potential configurations of fluid-filled chamber 60 except as noted below. As shown in FIGS. 3, 4, 7 and 8, fluid-filled chamber 310 is formed from a pair of opposing sheets 312, 314, which can be high-frequency weldable sheets, such as radio-frequency (RF) weldable sheets. High-frequency weldable or RF weldable sheets can include any type of sheet that can be welded via high-frequency welding techniques including RF welding techniques, such as a wide variety of polymer sheets that can be discretely heated to their molding temperature ranges via the application of high-frequency waves including radio waves and microwaves. These can include various types of polymer sheets noted above along with chamber 60, such as mono-layer and multi-layer polymer sheets formed from polymers like urethane, polyurethane, polyester, polyester polyurethane, and polyether polyurethane.

Fluid-filled chamber 310 includes an upper sheet 312 bonded to a lower sheet 314 by a perimeter weld 316 along a perimeter 322 of fluid-filled chamber 310. The upper sheet 312, lower sheet 314 and perimeter weld 316 joining the sheets together define an internal chamber 318 containing a fluid 320. The fluid 320 can include gases, such as air, nitrogen or a mixture of gases. Further, as noted above for chamber 60, fluid 320 can include octafluorapropane or any of the gasses disclosed in U.S. Pat. No. 4,340,626 to Rudy, such as hexafluoroethane and sulfur hexafluoride, for example. As with chamber 60, fluid 320 can be pressurized to a common pressure, such as a pressure substantially equal to atmospheric pressure (e.g., gauge pressure of about zero) to much higher positive pressures. In some configurations, chamber 310 can enclose fluids pressurized between zero and three-hundred-fifty kilopascals (i.e., approximately fifty-one pounds per square inch) or more.

In the configuration shown in FIGS. 3-8, upper sheet 312 has a contoured surface, such as a dish-like shape, lower sheet 314 is generally flat, and perimeter weld 316 is disposed along a lower lateral portion of fluid-filled chamber 310. However, these shapes are shown as example configurations and it is understood that either or both of sheets 312 and 314 can have relatively complex or simple contours and shapes. Further, it is understood that the shape of perimeter weld 316 can vary and can be relatively simple or complex as desired. In the configuration shown, perimeter weld 316 has a relatively simple oval shape. However, perimeter weld 316 can have a wide variety of complex shapes as appropriate for the desired fluid-filled chamber configuration.

Notably, perimeter weld 316 can be formed as a continuous, uninterrupted weld extending the length of the perimeter 322 of fluid-filled chamber 310 at the intersection of sheets 312 and 314. In addition, perimeter weld 316 can be formed as a uniform weld having a generally constant cross-sectional area that lacks appendages, extensions or other features. In particular, perimeter weld 316 lacks an inflation channel or any appendages, extensions or features remaining from the formation of an inflation channel used for filling internal chamber 318 with fluid 320 or created for filling internal chamber 318 with fluid as part of a secondary process.

As such, fluid-filled chamber 310 maintains a simple profile lacking unnecessary features, including unnecessary features along its perimeter weld, that can create superfluous material or stress concentrations during use. Further, fluid-filled chamber 310 can provide additional advantages, such as providing a profile that can allow it to be installed easily in a sole structure of an article of footwear without interfering with other structures during assembly or during use. In particular, it can provide a chamber 310 without features along the perimeter weld that can inhibit the flow of foam or other mold materials placed proximate the fluid-filled chamber during its installation into a sole structure and the subsequent manufacture of an article of footwear (i.e., features such as an extraneous inflation channel or other appendage or extension related to formation of the chamber).

In addition, fluid-filled chamber 310 can provide advantages related to its manufacture. For example, it can permit chamber 310 to be formed via a single stage manufacturing process using a single apparatus to (a) weld sheets 312 and 314 to each other, (b) fill chamber 310 with fluid 320, and (c) seal the fluid-filled chamber. In comparison, prior art fluid-filled chambers formed from polymer sheets are formed via multi-stage manufacturing processes using multiple manufacturing devices, stations and/or stages to weld the sheets to each other, fill the chamber with fluid and seal the chamber.

Further, some prior art chambers are initially formed from sheets of material with an inflation channel extending from the perimeter weld or being formed and remaining elsewhere on the chamber. The prior art chambers are subsequently filled with fluid and sealed after formation of the chamber using separate equipment than equipment that formed the chamber and as part of a separate process from the chamber-forming process. If the inflation channel is subsequently removed in whole or in part from the prior art chamber after inflation, it is done so after the chamber is filled and sealed, and the perimeter weld has a differing cross-section at the location of the inflation channel (i.e., the perimeter weld is non-uniform). FIGS. 9-14 show an example welder configuration that can form fluid-filled chamber 310 with a continuous, uniform perimeter weld without an inflation channel at the perimeter weld or elsewhere on the chamber, and that can form fluid-filled chamber 310 via a single stage process on a single apparatus.

Example Welder Apparatus

Figure 9:
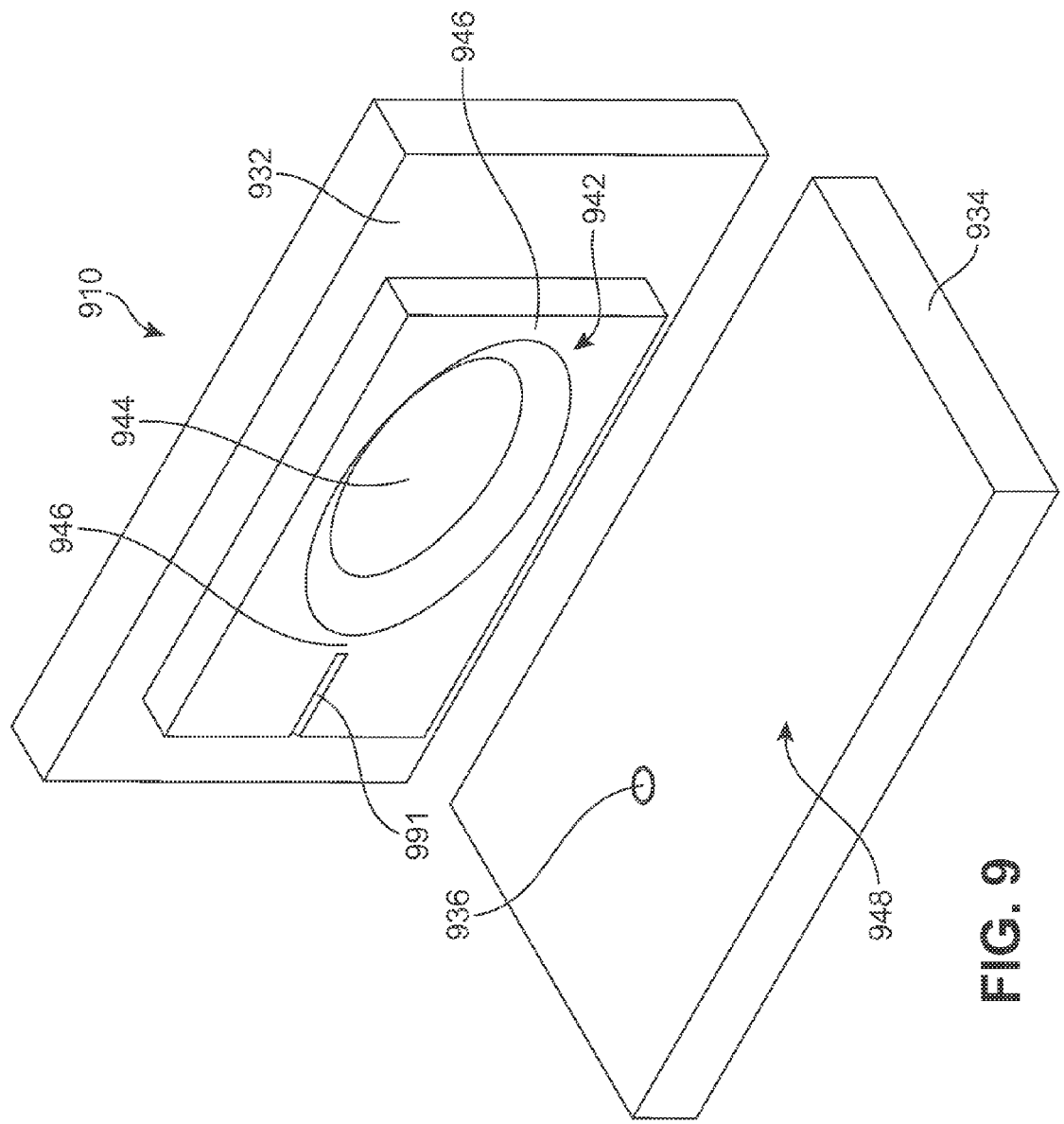
FIG. 9 is a perspective view of a high-frequency welder apparatus for forming a fluid-filled chamber.
Figure 10:
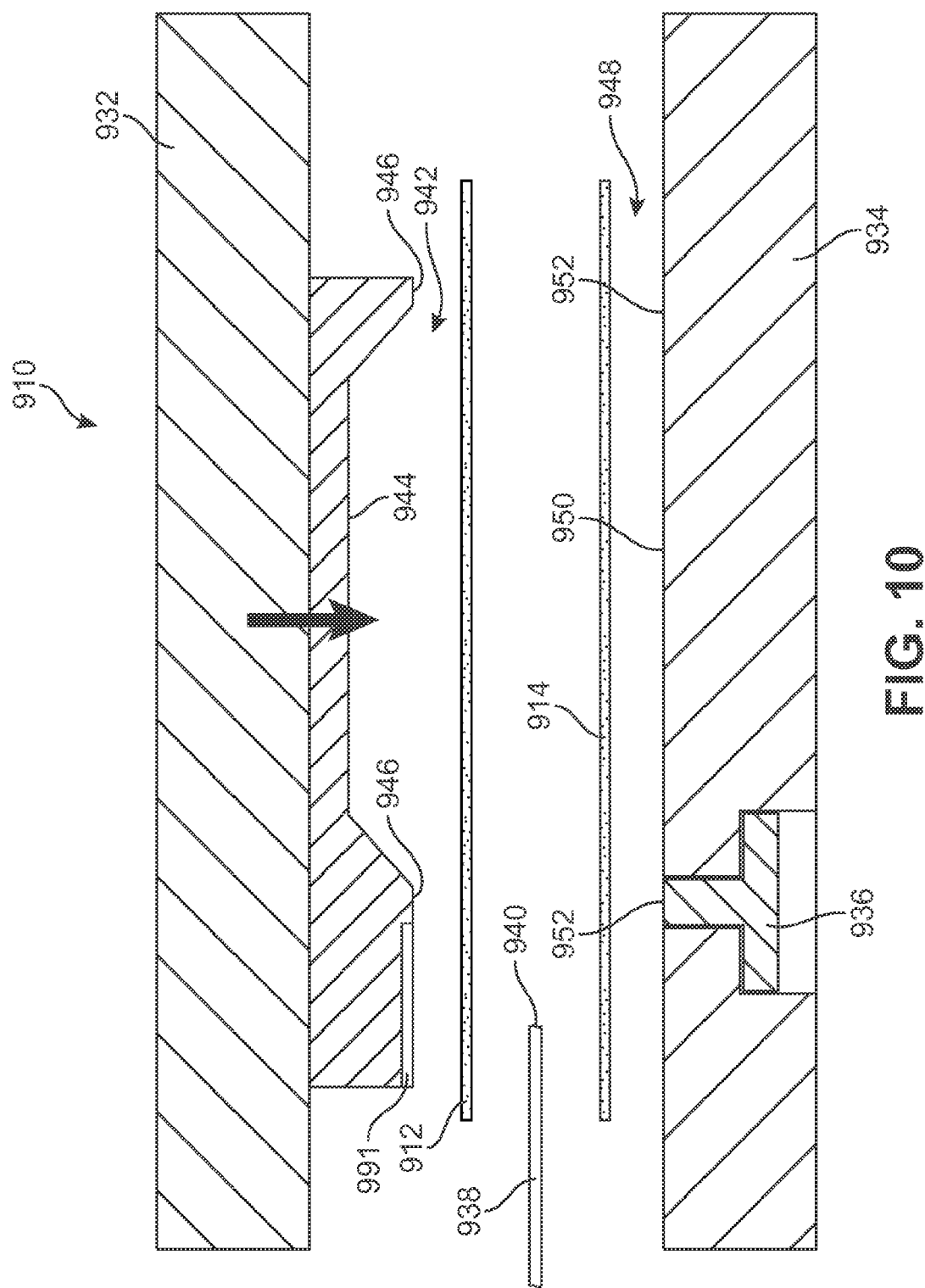
FIG. 10 is an elevational cross-sectional view of a portion of the high-frequency welder apparatus of FIG. 9 shown in a first position while open with opposing polymer sheets placed therein.

Referring now to FIGS. 9-14, an example high-frequency welder apparatus 910 is shown for forming a pressurized fluid-filled chamber that lacks an inflation channel from a two or more polymer sheets and to do so in a single stage that includes forming, filling and sealing the chamber. As shown in FIGS. 9 and 10, welder apparatus 910 includes a cavity weld support 932 (shown as an upper support, for example), a core weld support 934 (shown as a lower support, for example) disposed opposite cavity weld support 932, and a movable gate valve 936 formed in one of the weld supports (shown formed in the core weld support, for example). An inflation tube 938 is shown disposed between the weld supports in FIG. 10.

FIG. 10 shows welder apparatus 910 in an open configuration near the beginning of a single stage fluid-filled chamber welding/filling/sealing process. As such, FIG. 10 includes a pair of polymer sheets 912, 914 of high-frequency weldable polymer material disposed between the weld supports including an upper sheet 912 and an opposite lower sheet 914. The upper and lower sheets 912, 914 sandwich an inflation end 940 of inflation tube 938 located between edge portions of the sheets at a position proximate movable gate valve 936. The cavity weld support 932 and/or the core weld support 934 can form an extended external inflation channel 991 that can allow extended perimeter portions of the sheets to seal a length of inflation tube 938 during inflation and welding. This can provide an improved seal during processing by enabling a large seal region around the inflation tube. Early in the process, cavity and core weld supports 932 and 934 move toward each other to retain upper and lower sheets 912 and 914 in a desired position as shown in FIG. 11.

In the configuration shown in FIGS. 9-14, cavity weld support 932 has a contoured cavity surface 942 that includes a recessed central portion 944 and a raised perimeter weld portion 946 disposed about a central region. Likewise, core weld support 934 has a core surface 948 facing contoured cavity surface 942. Core surface 948 is generally flat in the configuration of FIGS. 9-14, but it can also be contoured as appropriate for desired fluid-filled chamber shapes and configurations. Core surface 948 also has a central portion 950 and a perimeter weld portion 952 disposed about the central portion.

Figure 11:
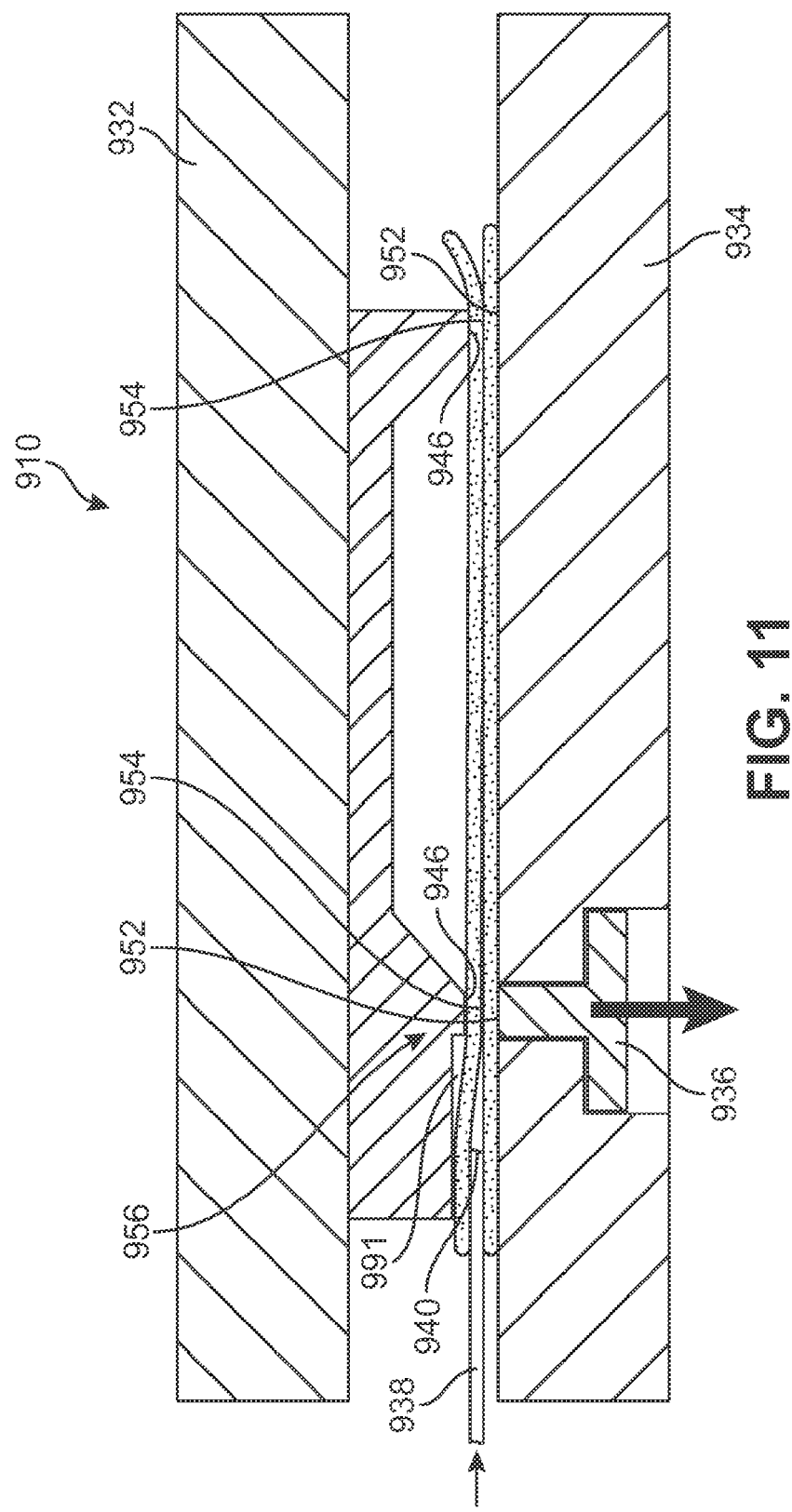
FIG. 11 is an elevational cross-sectional view of the portion of the high-frequency welder apparatus of FIG. 9 shown in a second position while closed with a gate valve moving out of a closed position to permit the inflow of pressurized fluid.
Figure 12:
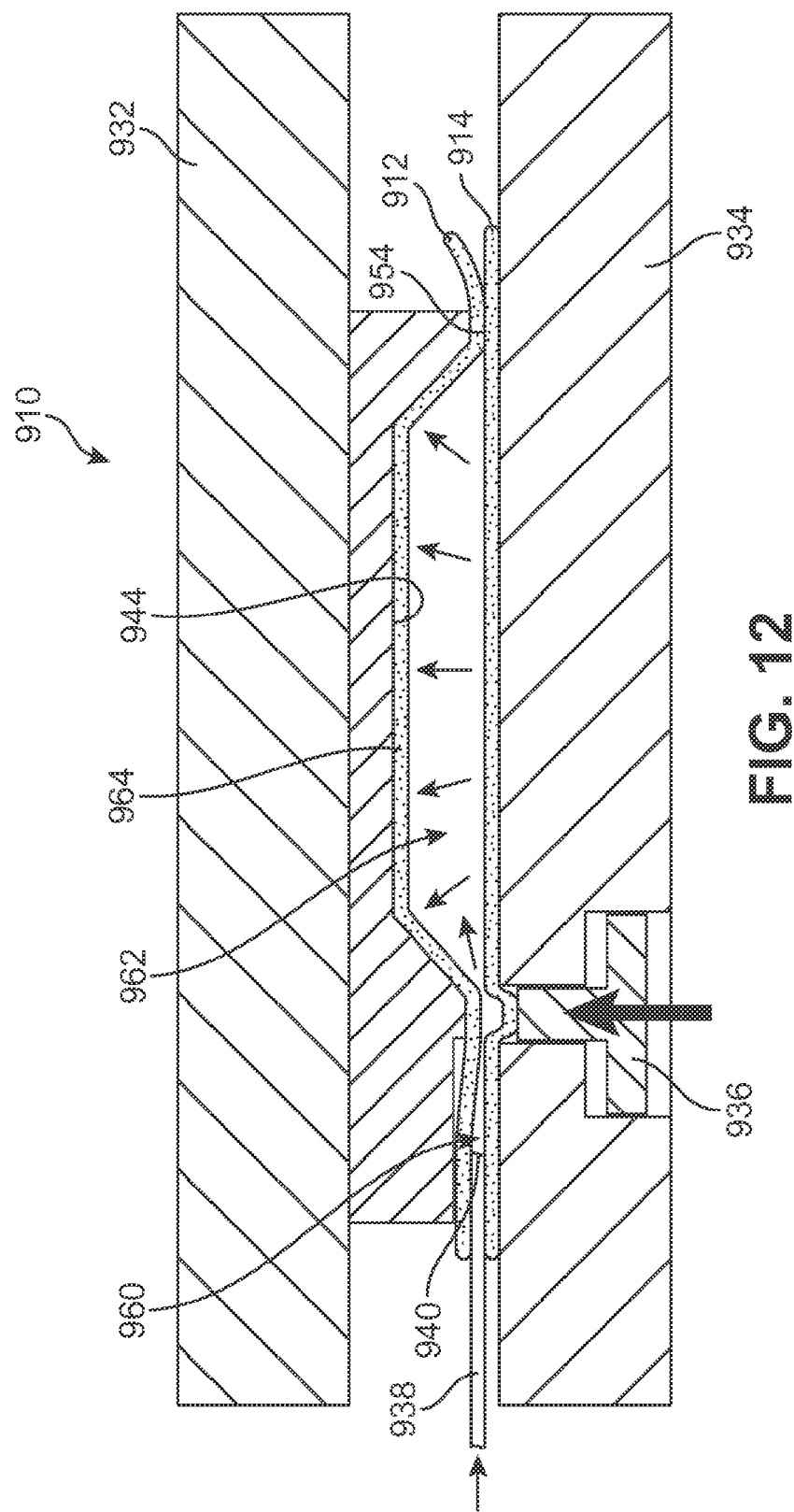
FIG. 12 is an elevational cross-sectional view of the portion of the high-frequency welder apparatus of FIG. 9 shown in a third position with the gate valve in an open position, pressurized fluid flowing through an inflation tube and a temporary inflation channel between the sheets into an internal chamber between the polymer sheets.
Figure 13:
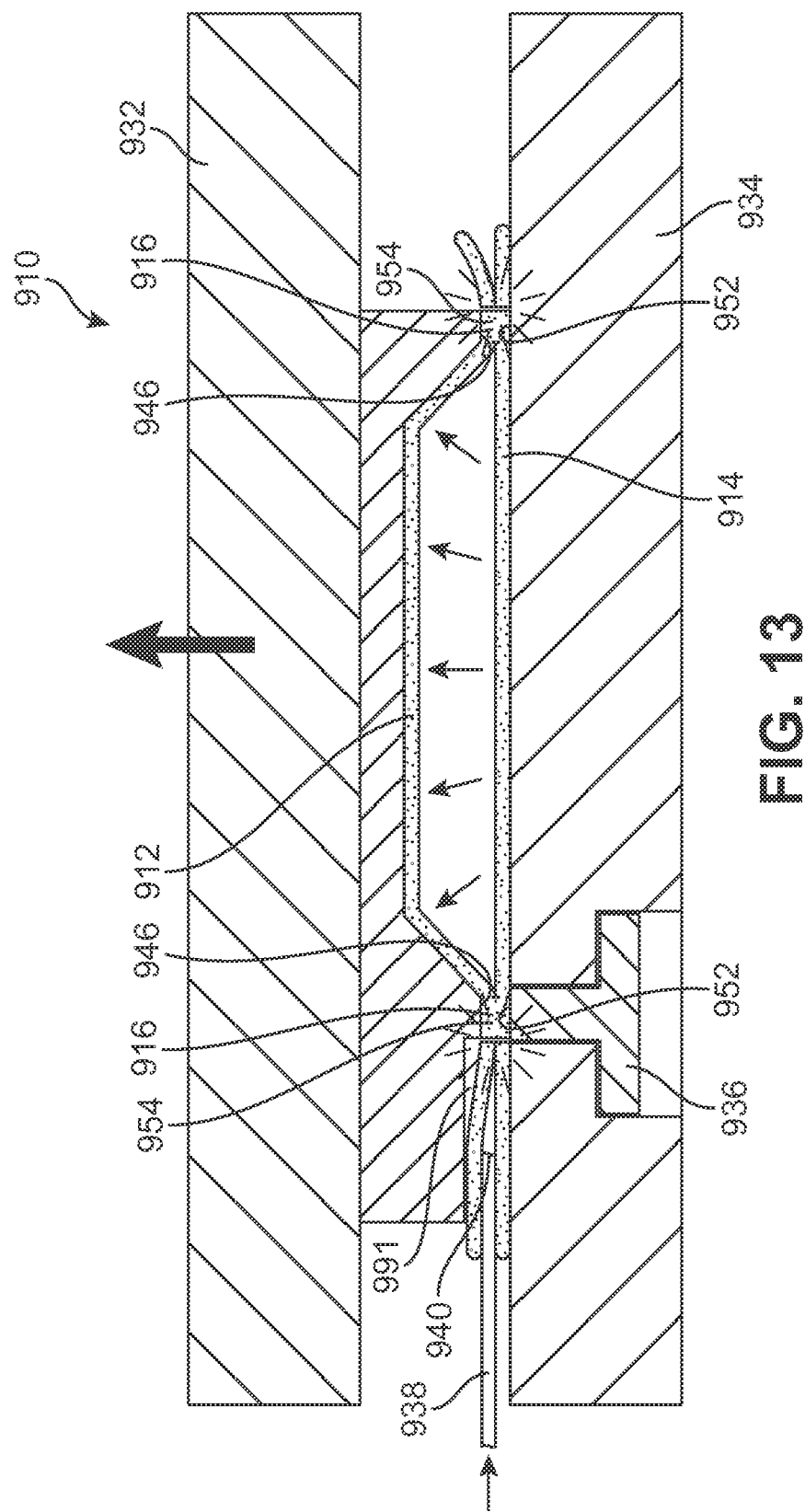
FIG. 13 is an elevational cross-sectional view of the portion of the high-frequency welder apparatus of FIG. 9 shown in a fourth position with the temporary inflation channel closed and a perimeter weld of the pressurized fluid-filled chamber being formed.

Cavity raised perimeter weld portion 946 and core perimeter weld portion 952 are configured to mate with one another (or otherwise complement each other, such as by applying opposing forces) when the welder apparatus 910 is in the closed position, such as is shown in FIGS. 11-13, during which upper and lower sheets 912 and 914 are sandwiched therebetween. In the closed configuration, the upper and lower sheets 912 and 914 are pressed against each other with sufficient force to form a seal 954 along matching perimeter portions of upper and lower sheets 912 and 914 that prevents fluid from flowing between the sheets at the seal.

As shown in FIGS. 11 and 12, gate valve 936 is disposed proximate core perimeter weld portion 952, seal 954 and inflation end 940 of inflation tube 938. Gate valve 936 is configured to retract away from core surface 948, core perimeter weld portion 952, and polymer sheets seal 954 at a discrete gate region 956 of core perimeter weld portion 952, which can unseal the polymer sheets at that location. In addition, inflation tube 938 is configured to deliver pressurized fluid, such as a pressurized gas noted above for use with pressurized fluid-filled chambers (like air or an inert gas like nitrogen), to an exit port on its inflation end 940 at a location between the polymer sheets that is proximate gate region 956 from which gate valve 936 has retracted. As illustrated in FIG. 12, the combination of gate valve 936 being retracted from gate region 956 and pressurized fluid being delivered to inflation end 940 permits a temporary inflation channel 960 to be formed between the polymer sheets and through a discrete portion of seal 954, which allows pressurized fluid from inflation tube 938 to flow into an interior void 962 formed between the polymer sheets within seal 954.

The entry of pressurized fluid into interior void 962 inflates the chamber and raises a corresponding central portion 964 of upper sheet 912 against recessed central portion 944 of contoured cavity surface 942. When interior void 962 has been inflated sufficiently, gate valve 936 begins to close while pressurized fluid continues to be provided to temporary inflation channel 960. When gate valve 936 is completely closed, it stops the flow of fluid into interior void 962, closes temporary inflation channel 960, and reestablishes seal 954 as a complete seal around interior void 962.

At this point (shown in FIG. 13), high frequency energy, such as radio frequency (RF) waves (e.g., microwaves) are directed between raised perimeter weld portion 946 and core perimeter weld portion 952 through portions of polymer sheets 912 and 914 disposed at seal 954 for a short weld period, as is known in the art of RF welding. The portions of polymer sheets 912 and 914 disposed at seal 954 are melted and bonded to each other during this period to form a perimeter weld 916 along a perimeter of interior void 962, which seals the chamber and forms a pressurized fluid-filled chamber. If desired, the cavity and core weld supports 932 and 934 can be retained in their closed position for a short cooling period after completion of the welding process, such as for a few seconds. The use of a cooling period can be beneficial for helping to retain the sealed, welded fluid-filled chamber bond, shape and configuration, such as for configurations involving high-pressure fluids, thin polymer sheets, or complex weld shapes.

Figure 14:
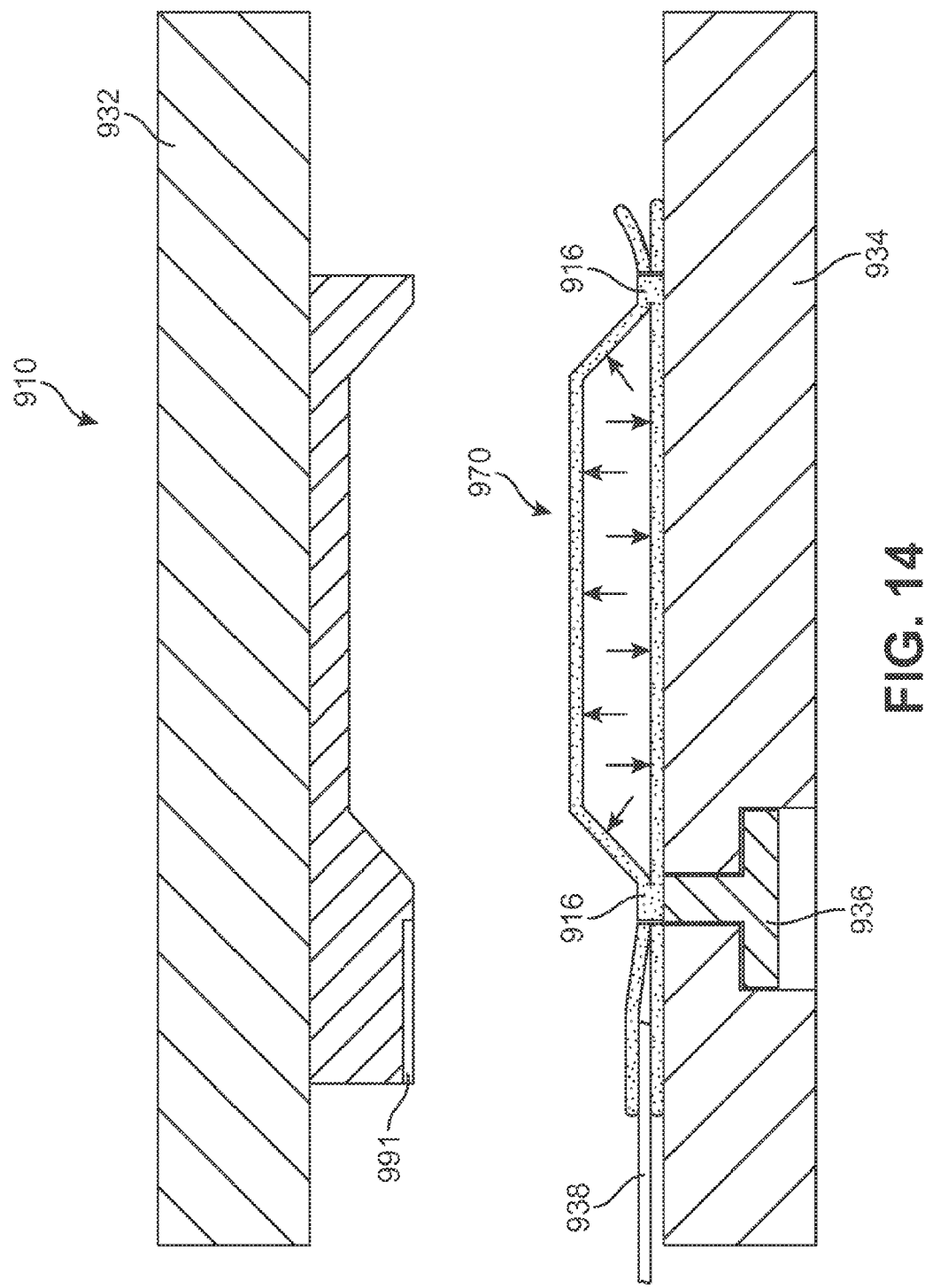
FIG. 14 is an elevational cross-sectional view of the portion of the high-frequency welder apparatus of FIG. 9 shown in a fifth position with the welder apparatus open and a pressurized fluid-filled chamber formed having a continuous perimeter weld and lacking an inflation channel.

Cavity and core weld supports 932 and 934 are separated thereafter to permit removal of the pressurized fluid-filled chamber 970 that was formed by the process. As shown in FIG. 14, the formation of fluid-filled chamber 970 using welder apparatus 910 as described provides a pressurized fluid-filled chamber that lacks an inflation channel or any appendages, extensions or features along perimeter weld 916. This is due to (a) the use of temporary inflation channel 960 to fill interior void 962 prior to welding, (b) the use of welding clamps to maintain the fluid seal thereafter through completion of the welding process, and (c) the gate design that eliminates the temporary inflation channel once the internal chamber has been filled, so there is no remaining inflation channel or appendages and no need for additional filling and sealing operations for the fluid-filled chamber.

Example Method

Figure 15:
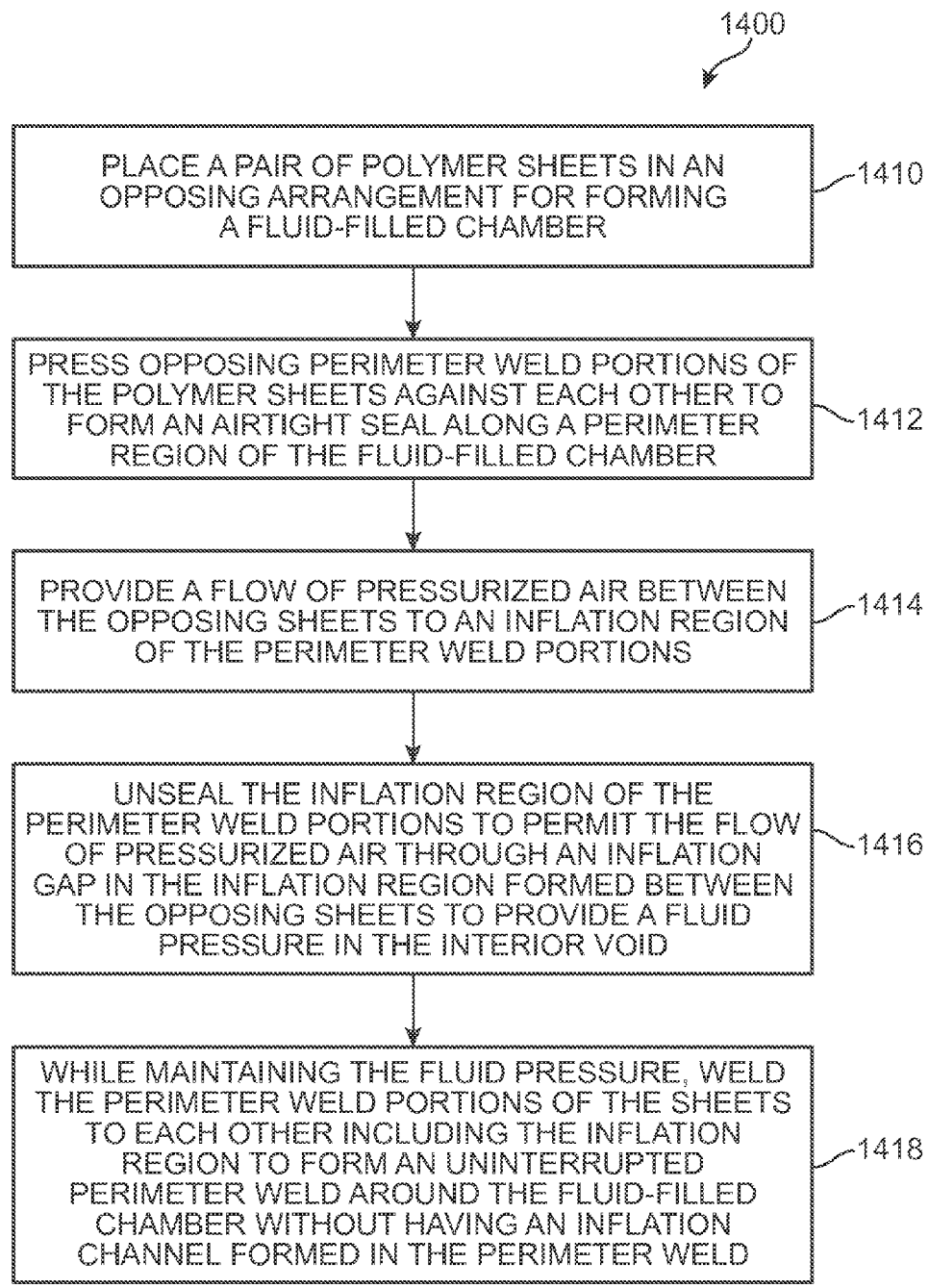
FIG. 15 illustrates example steps for a method of forming a fluid-filled pressurized chamber lacking an inflation channel, such as the fluid-filled chamber shown in FIG. 3.
Figure 16A:
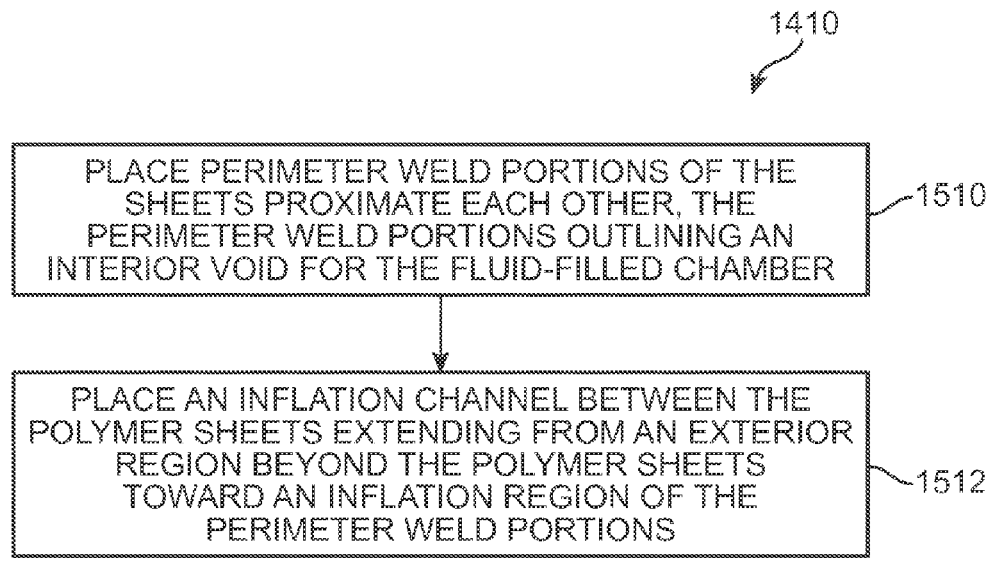
FIGS. 16A and 16B show additional example features and steps that can be used with the method of FIG. 15.
Figure 16B:
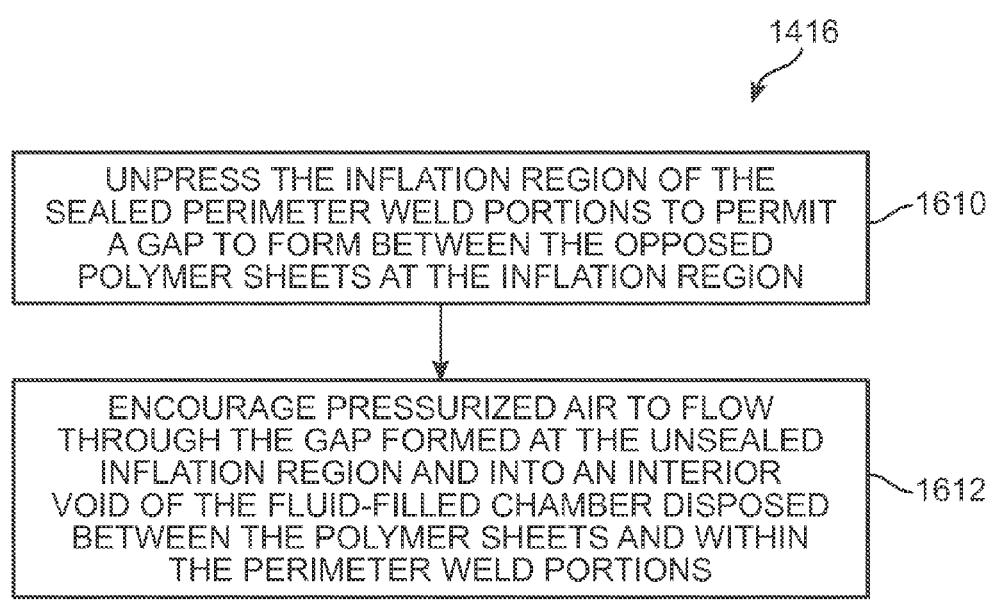

FIGS. 15 and 16A-16B show example steps for a method 1400 that can be used to form a fluid-filled chamber lacking an inflation channel and having a uniform sealing weld. The method described can be used with example weld apparatus 910 discussed above and can form the example fluid-filled chambers 310 and 970 discussed above, but can also be used with other weld devices and to form fluid-filled chambers having a variety of configurations. As shown in FIG. 15, method 1400 can include a step 1410 of placing a pair of polymer sheets in an opposing arrangement for forming a fluid-filled chamber and a step 1412 of pressing opposing perimeter weld portions of the polymer sheets against each other to form a fluid seal (i.e., an airtight seal) along a perimeter region of the fluid-filled chamber. Method 1400 can further include a step 1414 of providing a flow of pressurized air between the opposing sheets to a temporary inflation region of the perimeter weld portions and a step 1416 of unsealing the temporary inflation region of the perimeter weld portions to permit the flow of pressurized air through an inflation gap formed between the opposing sheets in the temporary inflation region until a desired fluid pressure is reached. Method 1400 can further include a step 1418 of, while maintaining the desired fluid pressure, welding the perimeter weld portions of the sheets to each other including the temporary inflation region to form an uninterrupted perimeter weld around the fluid-filled chamber without having an inflation channel formed in the perimeter weld.

Referring now to FIG. 16A, step 1410 of method 1400 can include a step 1510 of placing perimeter weld portions of the sheets proximate each other such that the perimeter weld portions outline an interior void for the fluid-filled chamber. In addition, step 1410 can further include a step 1512 of placing an inflation channel between the polymer sheets extending from an exterior region beyond the polymer sheets toward an inflation region of the perimeter weld portions.

Referring now to FIG. 16B, step 1416 of method 1400 can include step 1612 of unpressing the inflation region of the sealed perimeter weld portions to permit a gap to form between the opposed polymer sheets at the inflation region. In addition, step 1416 can further include step 1614 of encouraging pressurized fluid to flow through the gap formed at the unsealed inflation region and into an interior void of the fluid-filled chamber disposed between the polymer sheets and within the perimeter weld portions.

Another Example Welder Apparatus

Figure 17:
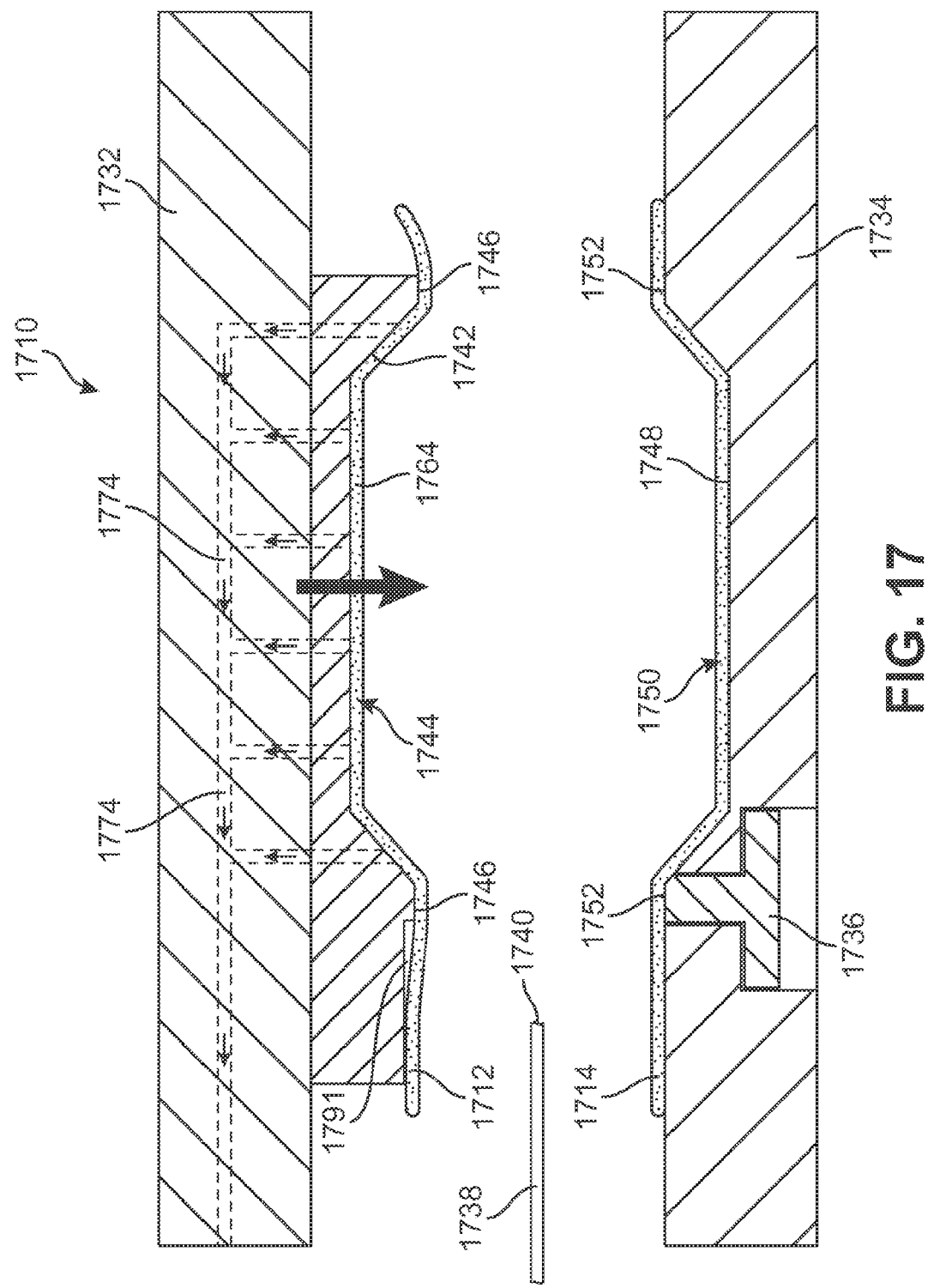
FIG. 17 is an elevational cross-sectional view of a portion of another configuration of a high-frequency welder apparatus for forming a pressurized fluid-filled chamber shown in a first position while open with opposing polymer sheets placed therein.

Referring now to FIGS. 17-21, another example high-frequency welder apparatus 1710 is shown for forming a pressurized fluid-filled chamber that lacks an inflation channel from two or more polymer sheets and to do so in a single stage that includes forming, filling and sealing the chamber. High-frequency welder apparatus 1710 generally includes the aspects and preferences discussed above with high-frequency welder apparatus 910, except as discussed below. As shown in FIG. 17, welder apparatus 1710 includes a cavity weld support 1732 (shown as an upper support, for example), a core weld support 1734 (shown as a lower support, for example) disposed opposite cavity weld support 1732, a movable gate valve 1736 formed in one of the weld supports (shown formed in the core weld support, for example), and an inflation tube 1738 disposed between the weld supports.

Figure 18:
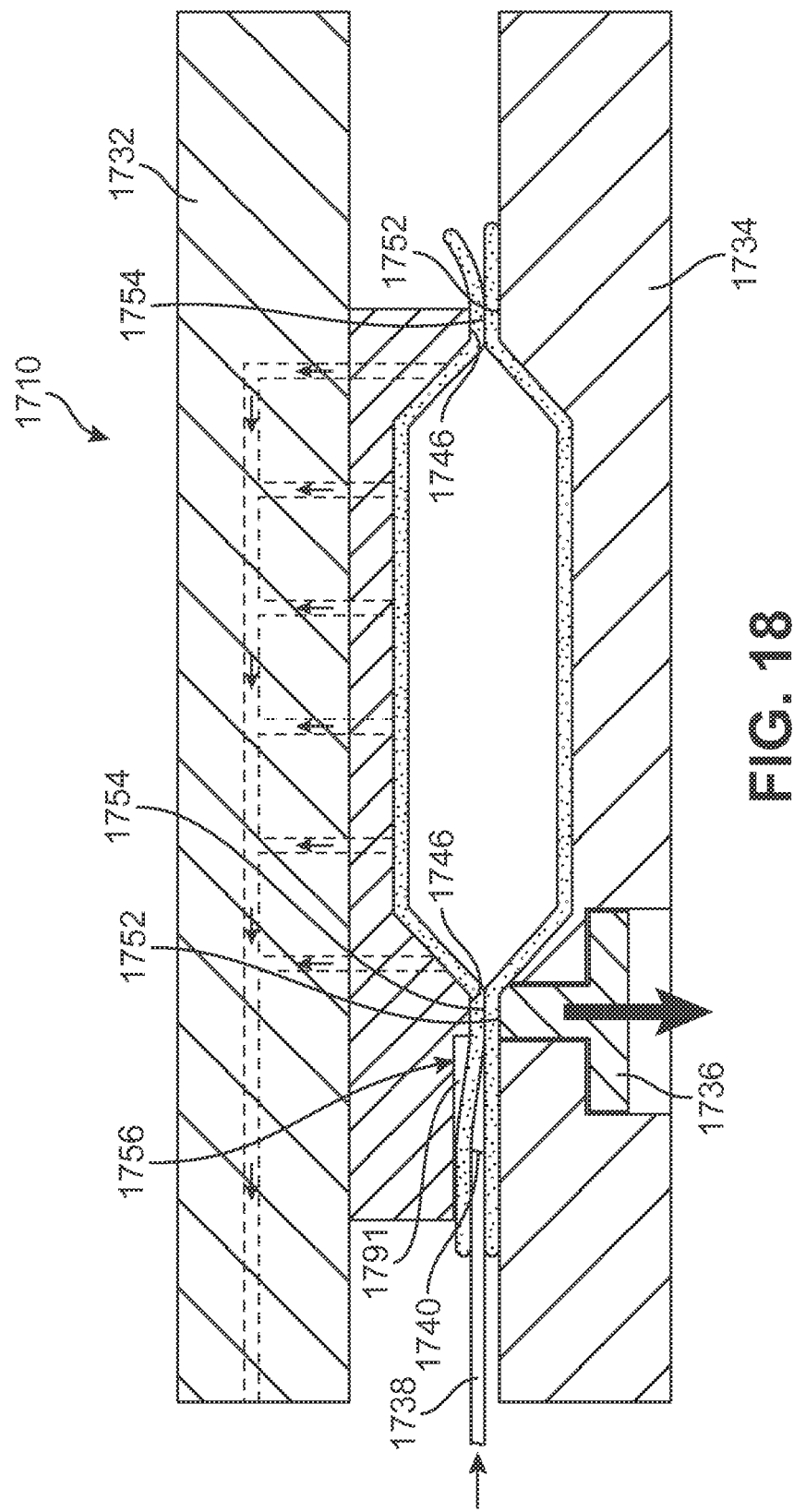
FIG. 18 is an elevational cross-sectional view of the portion of the high-frequency welder apparatus of FIG. 17 shown in a second position while closed with a gate valve moving out of a closed position to permit the flow of pressurized fluid.

FIG. 17 shows welder apparatus 1710 in an open configuration near the beginning of a single stage fluid-filled chamber welding/filling/sealing process. As such, FIG. 17 includes an a pair of polymer sheets 1712, 1714 of high-frequency weldable polymer material disposed between the weld supports including an upper sheet 1712 and an opposite lower sheet 1714. The upper and lower sheets 1712, 1714 sandwich an inflation end 1740 of an inflation tube 1738 located between edge portions of the sheets at a position proximate movable gate valve 1736. Early in the process, cavity and core weld supports 1732 and 1734 move toward each other to retain upper and lower sheets 1712 and 1714 in a desired position as shown in FIG. 18. Welder apparatus 1710 also includes an extended external inflation channel 1791, which is similar to inflation channel 991, that can allow extended perimeter portions of the sheets to seal a length of inflation tube 1738 during inflation and welding.

In the configuration shown in FIGS. 17-21, cavity weld support 1732 has a contoured cavity surface 1742 that includes a recessed central portion 1744 and a raised perimeter weld portion 1746 disposed about a central region. Likewise, core weld support 1734 also has a contoured core surface 1748 facing contoured cavity surface 1742 that also includes a recessed central portion 1750 and a raised perimeter weld portion 1752 disposed about the central portion. Thus, both sides of weld apparatus 1710 include contoured support surfaces for forming a fluid-filled chamber having contoured surfaces on both primary surfaces. In addition, cavity weld support 1732 includes optional vacuum lines 1774, which can help retain upper sheet 1712 in a desired position against cavity surface 1742 during welding, inflating and sealing operations and allow any trapped air between the upper sheet 1712 and mold cavity surface 1742 to be vented. Of course, it is understood that vacuum lines could also be included in core weld support 1734 as desired. It is further understood that weld supports 1732 and 1734 could be oriented in various ways, such as both weld supports being oriented vertically, at various angles, or in a reverse configuration with the core weld support 1734 being disposed above the cavity weld support 1732.

Cavity raised perimeter weld portion 1746 and core raised perimeter weld portion 1752 are configured to mate with one another (or otherwise complement each other, such as by applying opposing forces) when the welder apparatus 1710 is in the closed position, such as is shown in FIGS. 10-12, during which upper and lower sheets 1712 and 1714 are sandwiched therebetween. In the closed configuration, the upper and lower sheets 1712 and 1714 are pressed against each other with sufficient force to form a seal 1754 along matching perimeter portions of upper and lower sheets 1712 and 1714 that prevents fluid from flowing between the sheets at the seal.

Figure 19:
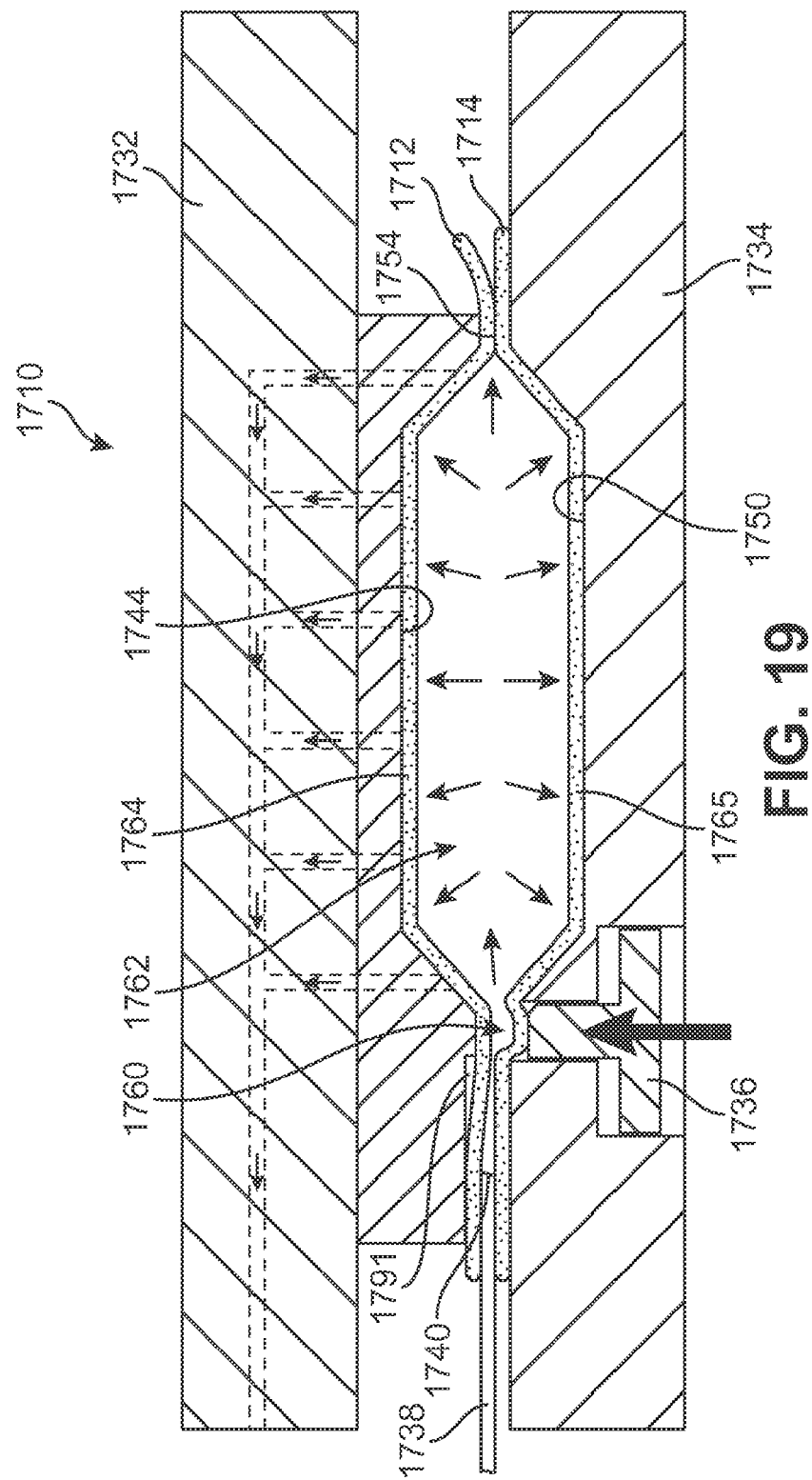
FIG. 19 is an elevational cross-sectional view of the portion of the high-frequency welder apparatus of FIG. 17 shown in a third position with the gate valve in an open position, pressurized fluid flowing through an inflation tube and a temporary inflation channel between the sheets into an interior void between the polymer sheets.
Figure 20:
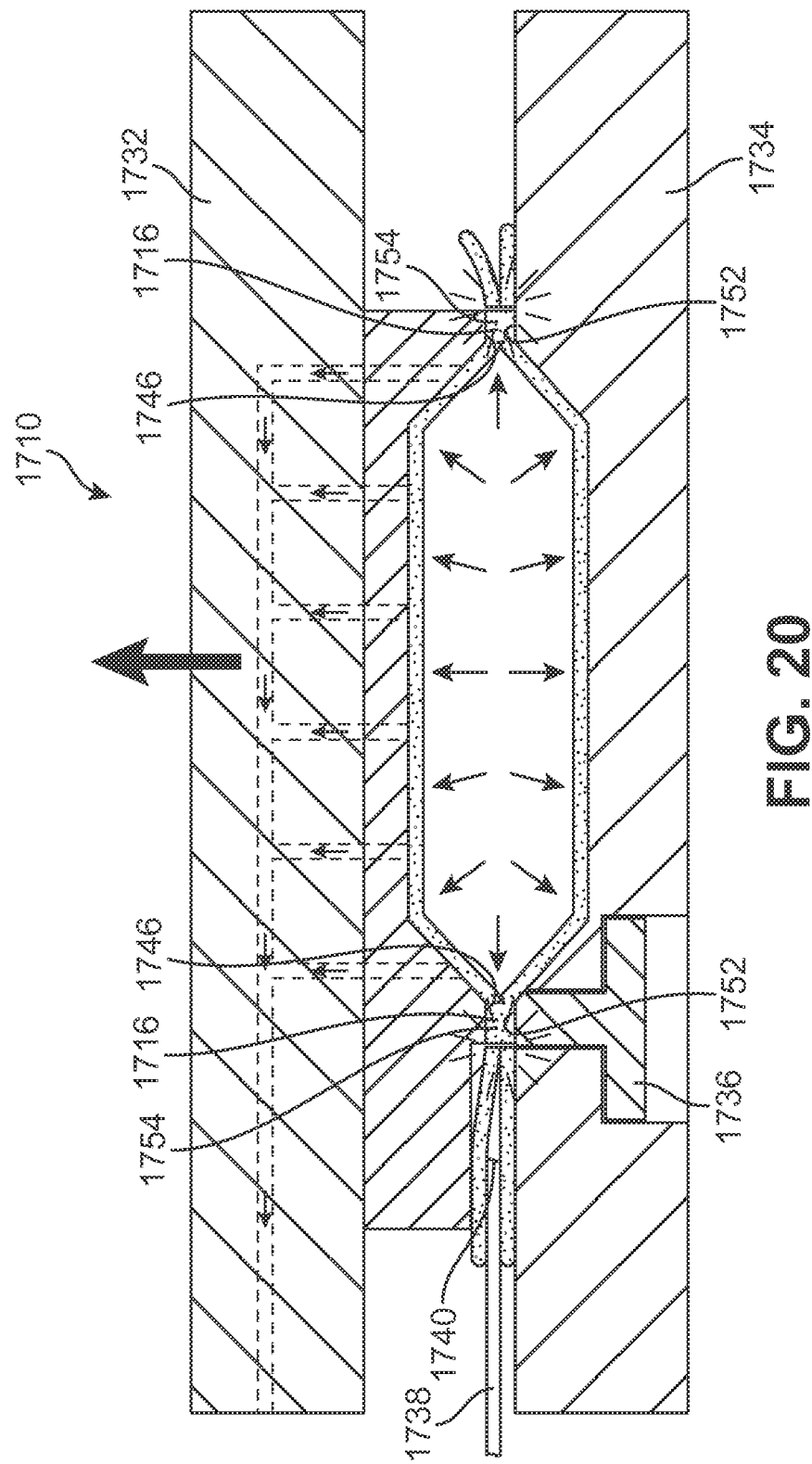
FIG. 20 is an elevational cross-sectional view of the portion of the high-frequency welder apparatus of FIG. 17 shown in a fourth position with the temporary inflation channel closed and a perimeter weld of the pressurized fluid-filled chamber being formed.

As shown in FIGS. 18 and 19, gate valve 1736 is disposed proximate raised perimeter weld portion 1752, seal 1754 and an inflation end 1740 of inflation tube 1738. Gate valve 1736 is configured to retract away from contoured core surface 1748, core perimeter weld portion 1752, and seal 1754 at a discrete gate region 1756 of raised perimeter weld portion 1752, which can unseal the polymer sheets at that location. In addition, inflation tube 1738 is configured to deliver pressurized fluid, such as a pressurized gas noted above for use with pressurized fluid-filled chambers like air or an inert gas like nitrogen, to an exit port on its inflation end 1740 at a location between the polymer sheets that is proximate gate region 1756 from which gate valve 1736 has retracted. As illustrated in FIG. 19, the combination of gate valve 1736 being retracted from gate region 1756 and pressurized fluid being delivered to inflation end 1740 permits a temporary inflation channel 1760 to be formed between the polymer sheets and through a discrete portion of seal 1754, which allows pressurized fluid from inflation tube 1738 to flow into an interior void 1762 formed between the polymer sheets within seal 1754.

The entry of pressurized fluid into interior void 1762 bilaterally inflates the chamber and raises a corresponding central portion 1764 of upper sheet 1712 against recessed central portion 1744 of contoured cavity surface 1742 and depresses a corresponding central portion 1765 of lower sheet 1714 against recessed central portion 1750 of contoured core surface 1748. When interior void 1762 has been inflated sufficiently, gate valve 1736 begins to close while pressurized fluid continues to be provided to temporary inflation channel 1760. When gate valve 1736 is completely closed, it stops the flow of fluid into interior void 1762, closes temporary inflation channel 1760, and reestablishes seal 1754 as a complete seal around interior void 1762.

At this point (shown in FIG. 20), high frequency energy, such as radio frequency (RF) waves (e.g., microwaves) are directed between raised perimeter weld portion 1746 and raised perimeter weld portion 1752 through portions of polymer sheets 1712 and 1714 disposed at seal 1754 for a short weld period, as is known in the art of RF welding. The portions of polymer sheets 1712 and 1714 disposed at seal 1754 are melted and bonded to each other during this period to form a perimeter weld 1716 along a perimeter of interior void 1762, which seals the chamber and forms a pressurized fluid-filled chamber. If desired, the cavity and core weld portions 1732 and 1734 can be retained in their closed position for a short cooling period after completion of the welding process, such as for a few seconds. The use of a cooling period can be beneficial for helping to retain the sealed, welded fluid-filled chamber bond, shape and configuration, such as for configurations involving high-pressure fluids, thin polymer sheets, or complex weld shapes.

Figure 21:
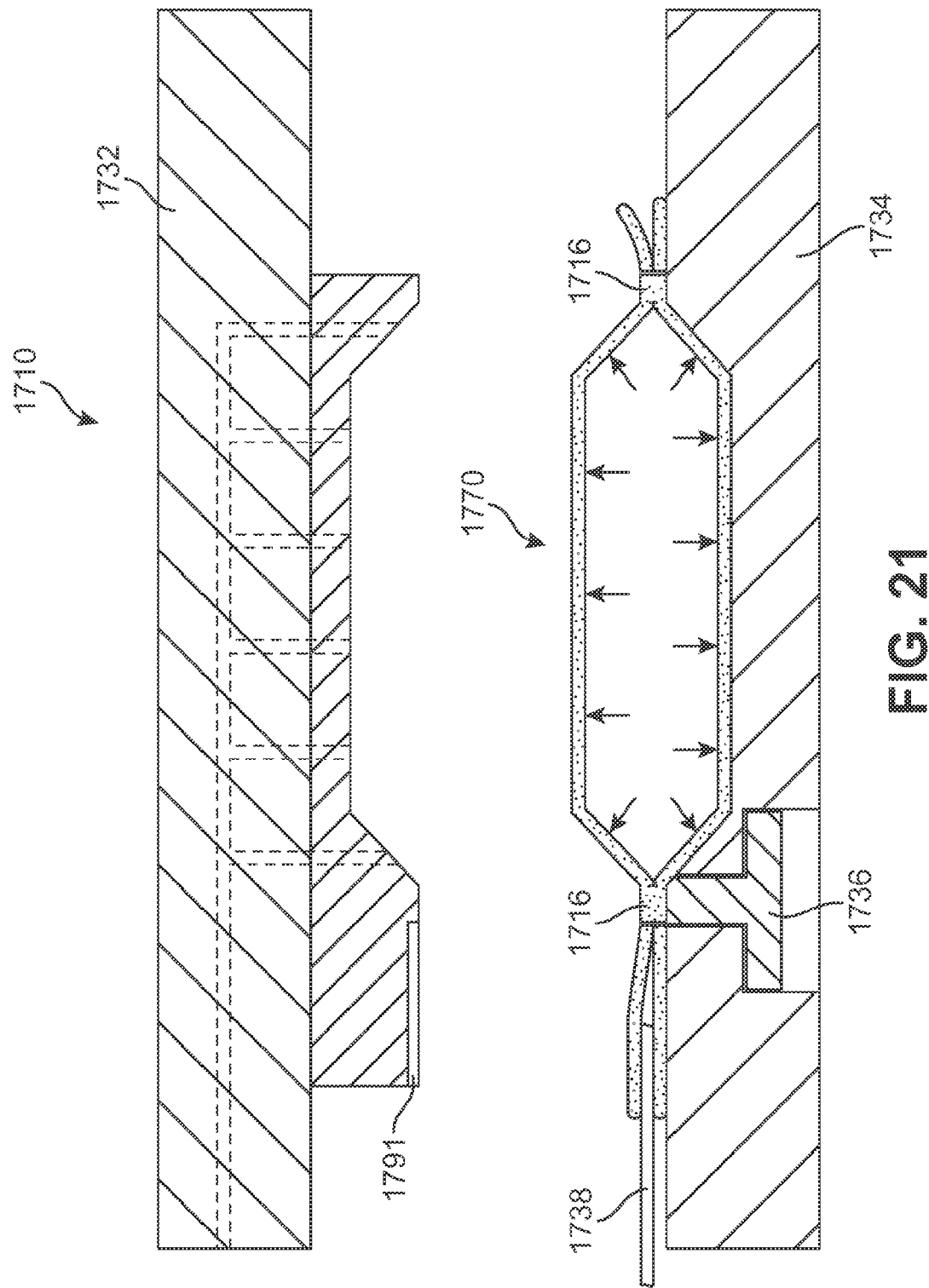
FIG. 21 is an elevational cross-sectional view of the portion of the high-frequency welder apparatus of FIG. 17 shown in a fifth position with the welder open and a pressurized fluid-filled chamber formed having a continuous perimeter weld and lacking an inflation channel.

Cavity and core weld portions 1732 and 1734 are separated thereafter to permit removal of the pressurized fluid-filled chamber 1770 that was formed by the process. As shown in FIG. 21, the formation of fluid-filled chamber 1770 using weld apparatus 1710 as described provides a pressurized, fluid-filled chamber that lacks an inflation channel and any appendages along perimeter weld. This is due to (a) the novel use of a temporary inflation channel to fill the interior void 1760 prior to welding, (b) the use of welding clamps to maintain the fluid seal thereafter through completion of the welding process, and (c) the gate design that eliminates the temporary inflation channel once the internal chamber has been filled, so there is no remaining inflation channel or appendages and no need for additional filling and sealing operations for the fluid-filled chamber.

An Additional Welder Apparatus

Figure 22:
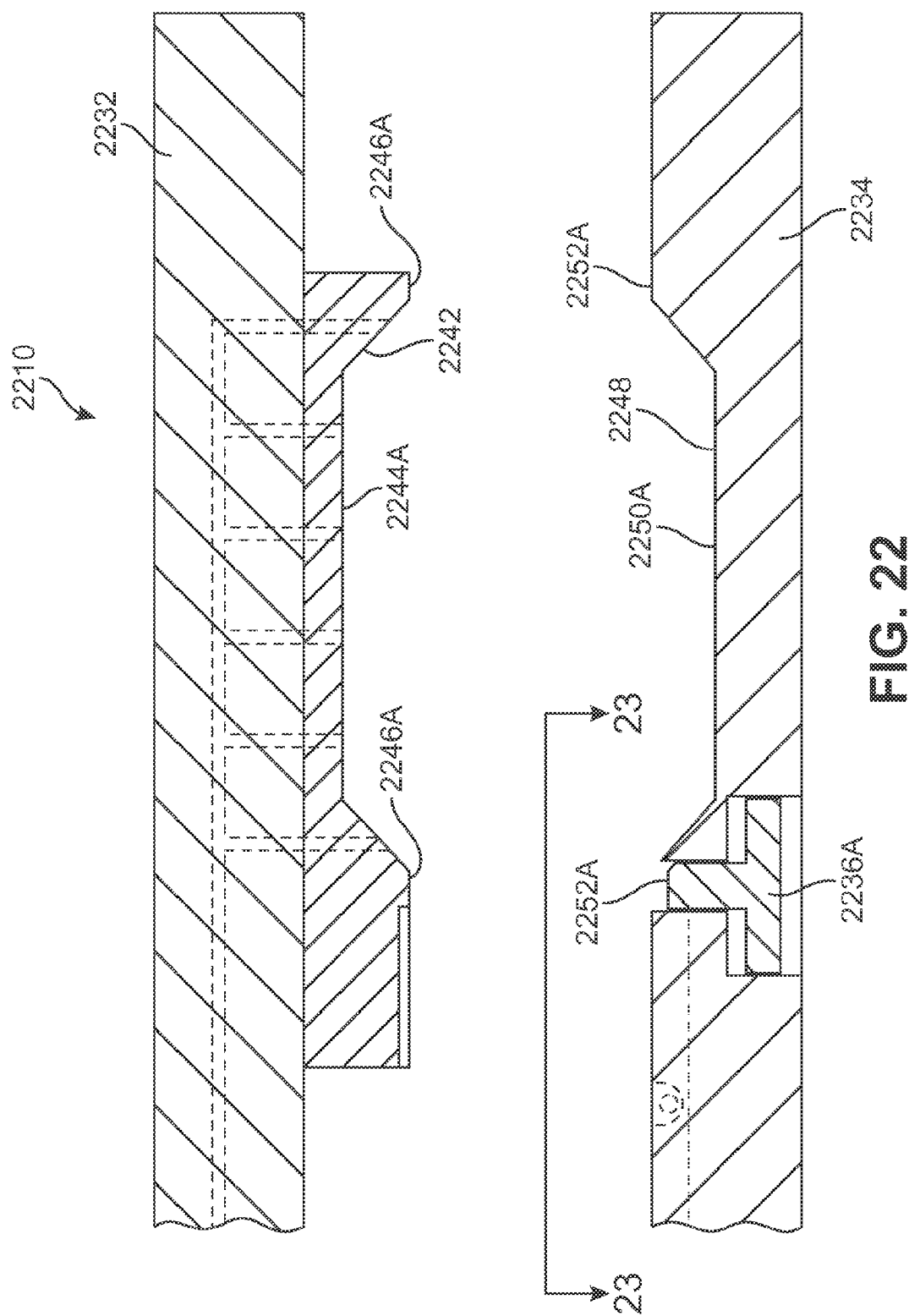
FIG. 22 is an elevational cross-sectional view of a portion of yet another configuration of a high-frequency welder apparatus for forming a pressurized fluid-filled chamber shown in a first position while open with opposing polymer sheets placed therein.
Figure 23:
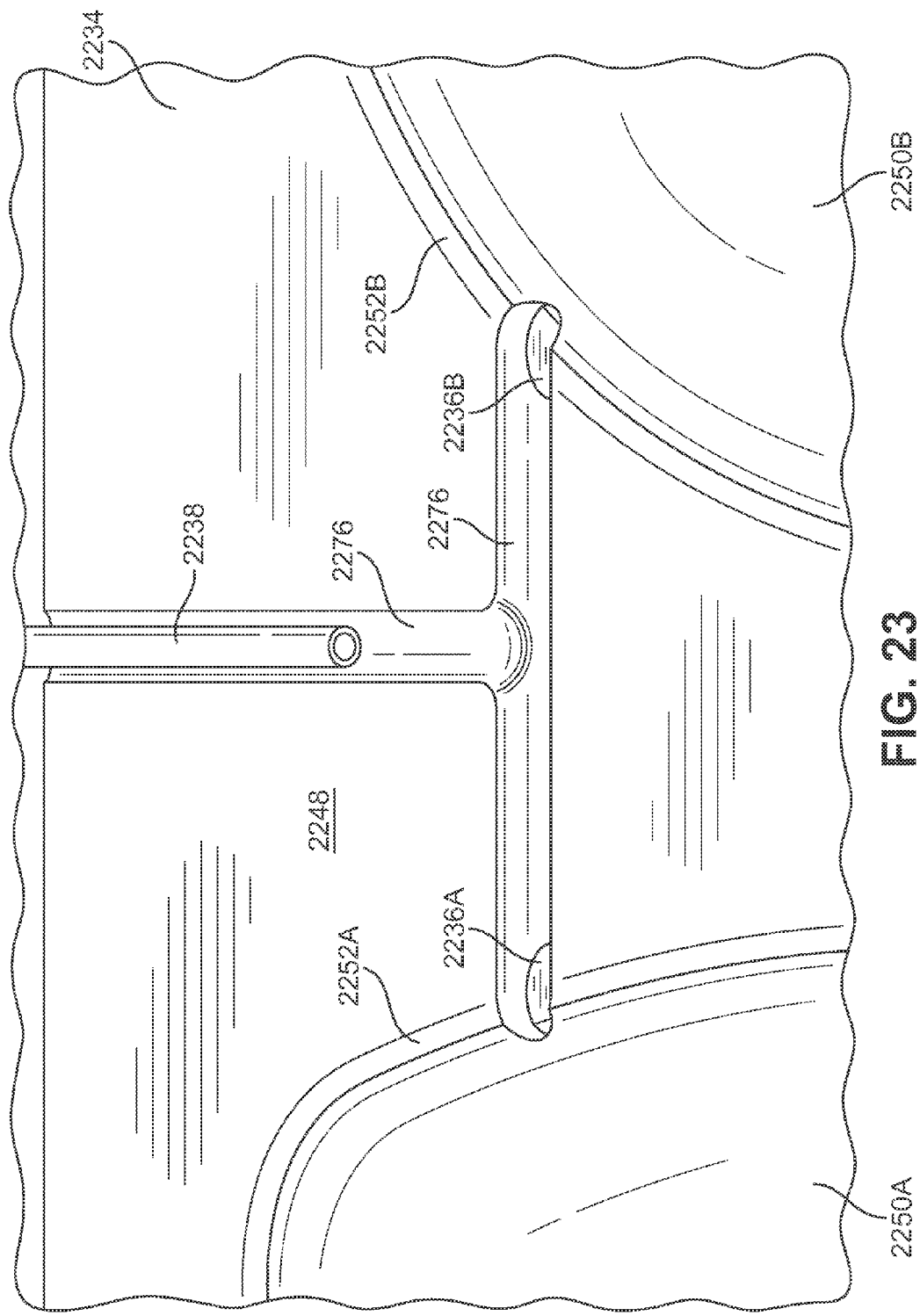
FIG. 23 is a perspective view a portion of a lower mold structure of the welder apparatus of FIG. 22 as indicate by line 23-23 shown in FIG. 22.

Referring now to FIGS. 22-23, yet another example high-frequency welder apparatus 2210 is shown for forming a pressurized fluid-filled chamber that lacks an inflation channel from a two or more polymer sheets and to do so in a single stage that includes forming, filling and sealing the chamber. High-frequency welder apparatus 2210 generally includes the aspects and preferences discussed above with high-frequency welder apparatus 1710, except as discussed below. In particular, high-frequency welder apparatus 2210 is generally a dual mold version of high-frequency welder apparatus 1710 that can simultaneously form, fill and seal two fluid-filled chambers. As such, cavity weld support 2232 has a contoured cavity surface 2242 having two recessed central portions 2244A, 2244B and two raised perimeter weld portions 2246A, 2246B—a set of each corresponding to each of the fluid-filled chambers. Similarly, core weld support 2234 has a contoured core surface 2248 having two recessed central portions 2250A, 2250B and two raised perimeter weld portions 2252A, 2252B. Only one set of the recessed central portions and raised perimeter weld portions for each of the cavity and core weld supports is shown in FIG. 22.

However, FIG. 23 shows portions of both recessed central portions 2250A and 2250B and both raised perimeter weld portions 2252A and 2252B for the core weld support 2234. It is understood that many other configurations can be used for high-frequency welder apparatus 2210, such as multi-mold configurations have more than two mold cavities and/or having mold cavities in varying configurations. FIG. 23 further illustrates a mixed mold configuration for forming fluid-filled chambers having differing configurations. For instance, raised perimeter weld portion 2252A outlines a fluid-filled chamber having a generally rounded rectangular perimeter shape, whereas raised perimeter weld portion 2252B outlines a fluid-filled chamber having a generally circular or oval perimeter shape.

As with previous configurations, high-frequency welder apparatus 2110 also makes use of angled gate valves 2236A and 2236B. Angled gate valves can be beneficial for helping to guide a desired shape and path for the temporary inflation channel (e.g., temporary inflation channels 960 and 1760 shown in FIGS. 11 and 19) and ensuring that the perimeter weld includes as much as possible of the temporary inflation channel when it is formed. High-frequency welder apparatus 2210, however, makes use of a single inflation tube 2238 for providing pressurized fluid to multiple internal chambers for forming multiple fluid-filled chambers.

Along with this efficient arrangement for providing pressurized fluid from a single inflation tube, core weld support 2234 includes inflation canals 2276 formed in core surface 2248, which encourage a desired shape, orientation and configuration for the temporary inflation channels (not shown in FIGS. 21 and 22) when filling the corresponding fluid-filled chambers. It is understood that matching inflation canals can also be formed in the cavity mold support 2232 as desired, either alone or in combination with core inflation canals 2276, and that similar canals can be formed in other high-frequency welder devices including those discussed previously.

Figure 24:
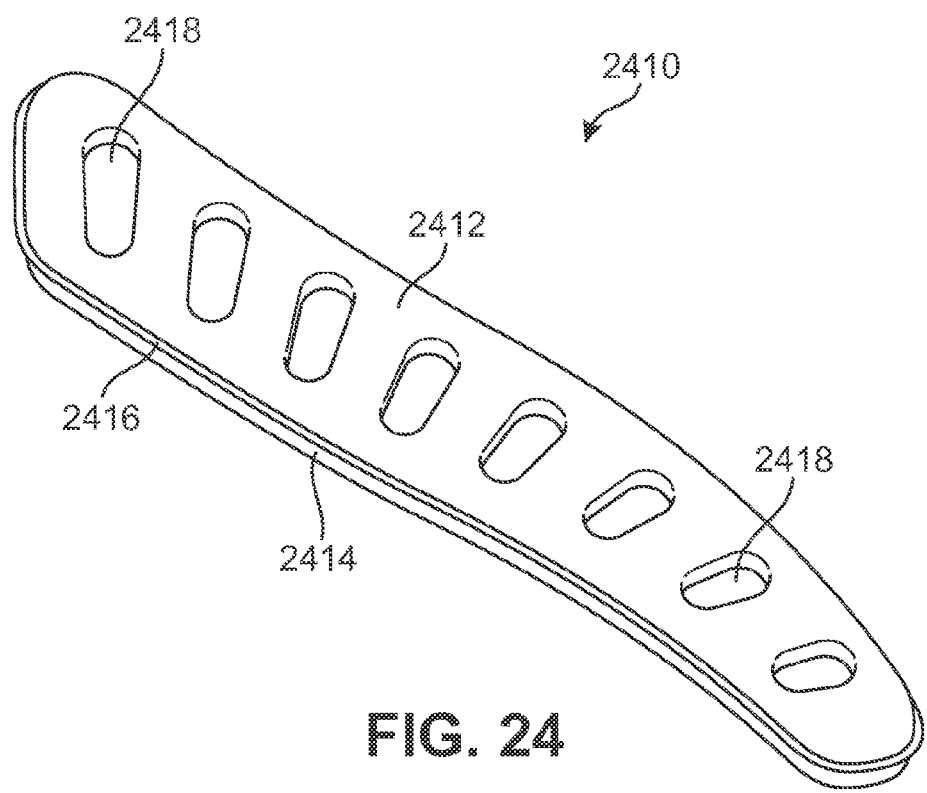
FIG. 24 is a perspective view of another example configuration of a fluid-filled chamber having a continuous perimeter weld and lacking an inflation channel.

Another Example Fluid-Filled Chamber Configuration and Example Welding Apparatus FIG. 24 depicts another fluid-filled chamber 2410 having a general configuration suitable for incorporation into a strap of a sports container for carrying sports equipment, such as a golf bag for carrying golf clubs, or a hockey bag for carrying hockey equipment. Concepts associated with fluid-filled chamber 2410 can also be applied to other personal carriers, such as backpacks or luggage, or to any of the variety of products discussed above with respect to fluid-filled chamber 310. Accordingly, the concepts disclosed herein can be applied to a wide variety of products.

Fluid-filled chamber 2410 generally includes aspects and preferences discussed above regarding fluid-filled chambers 60 and 310, except as noted below. As shown in FIG. 24, fluid-filled chamber 2410 is formed from a pair of opposing sheets which can be high-frequency weldable sheets such as RF weldable sheets. More particularly, fluid-filled chamber 2410 includes an upper sheet 2412 joined to a lower sheet 2414 by a continuous, uninterrupted perimeter weld 2416 along a perimeter of fluid-filled chamber 2410. Fluid-filled chamber 2410 additionally includes a plurality of internal welds 2418 spaced inward from the perimeter of chamber 2410. Upper sheet 2412, lower sheet 2414, perimeter weld 2416, and internal welds 2418 together define fluid-filled chamber 2410.

As shown in FIG. 24, fluid-filled chamber 2410 has a generally elongate configuration with a width and a length that is greater than the width by a factor of two. In various configurations, the length of the elongate configuration may be greater than the width of the elongate configuration by a factor of two, three, five, or more. The elongate configuration of fluid-filled chamber 2410 can facilitate its use in the strap of the sports container, to enhance the cushioning the strap provides when resting against the body of a wearer.

Figure 25:
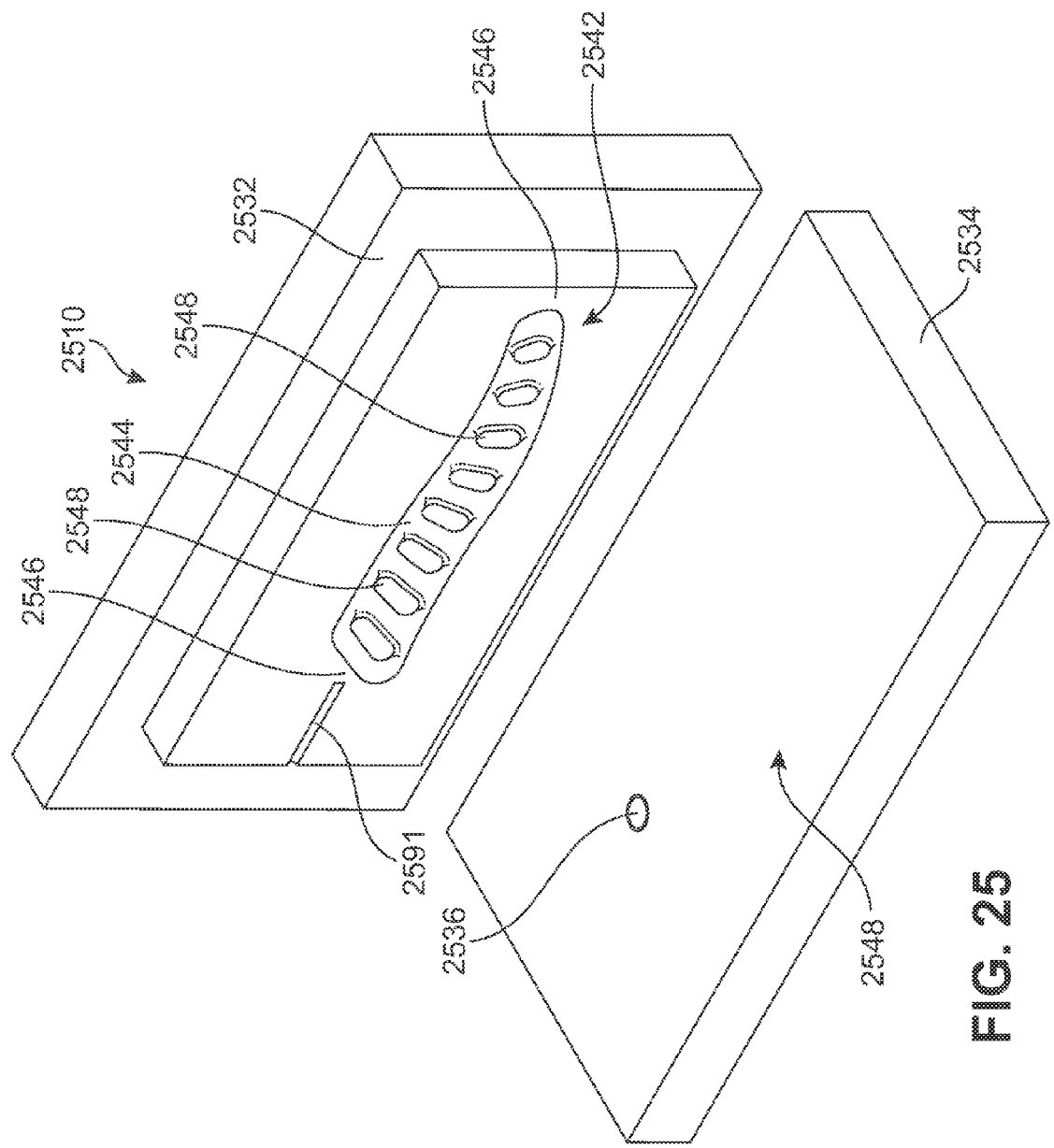
FIG. 25 is a perspective view of another configuration of a high-frequency welder apparatus for forming a pressurized fluid-filled chamber.

FIG. 25 shows an example high-frequency welder apparatus 2510 for forming fluid-filled chamber 2410. Welder apparatus 2510 generally includes aspects and preferences noted above regarding welder apparatuses 910, 1710, and 2210, except as noted below. As depicted, welder apparatus 2510 includes a cavity weld support 2532, a core weld support 2534 disposed opposite cavity weld support 2532, and a movable gate valve 2536 (shown formed in core weld support 2534).

Cavity weld support 2532 has a contoured cavity surface 2542 that includes a recessed central portion 2544, a raised perimeter weld portion 2546 disposed about a central region, and a plurality of internal weld portions 2548. As depicted, core weld support 2534 has a generally flat surface facing contoured cavity surface 2542. (In other configurations, the core surface can also be contoured as appropriate for the desired shape of fluid-filled chamber 2410.)

The surface of core weld support 2534 has a central portion and a perimeter weld portion disposed about the central portion. When welder apparatus 2510 is in the closed position, raised perimeter weld portion 2546 of cavity weld support 2532 is configured to mate with the perimeter weld portion of the surface of core weld support 2534. The surface of core weld support 2534 additionally has an internal weld portion 2548 in the central portion of the core surface. When welder apparatus 2510 is in the closed position, perimeter weld portions 2548 of cavity weld support 2532 are configured to mate with perimeter weld portion 2548 of core weld support 2534. The cavity weld support 2532 and/or the core weld support 2534 can form an extended external inflation channel 2591 that can allow extended perimeter portions of the sheets to seal a length of an inflation tube during inflation and welding.

When welder apparatus 2510 is closed, two polymer sheets may be pressed against each other by raised perimeter weld portion 2546 of cavity weld support 2532 and the perimeter weld portion of the surface of core weld support 2534 with sufficient force to form a seal along perimeter portions of the two polymer sheets. Similarly, the polymer sheets may be pressed against each other by perimeter weld portions 2548 of cavity weld support 2532 and perimeter weld portion 2548 of core weld support 2534 with sufficient force to form a plurality of interior seals at internal portions of the two polymer sheets.

Subsequently, gate valve 2536 may retract away from the core surface and unseal the polymer sheets at a location proximate to gate valve 2536, and an inflation tube within external inflation channel 2591 may deliver a pressurized fluid to the same location, the combination of which may form a temporary inflation channel. The pressurized fluid may flow through the temporary inflation channel to inflate the chamber. When sufficient inflation has been achieved, gate valve 2536 may close, stopping the flow of pressurized fluid and reestablishing the seal as a complete seal. High frequency energy (e.g. RF waves) may then be directed between mating portions of cavity weld support 2532 and core weld support 2534, causing the polymer sheets to melt and bond with each other to at the perimeter seal and the interior seals to form a perimeter weld and a plurality of internal welds. Cavity weld support 2532 and core weld support 2534 may thereafter be separated, and fluid-filled chamber 2410 with continuous, uninterrupted perimeter weld 2416 may be removed.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications can be made to the configurations described above without departing from the scope of the present invention, as defined by the appended claims.

What is claimed is:

1. A mold for forming a fluid-filled chamber formed from a first sheet and a second sheet, the mold comprising:
    a first mold half having a first weld portion;
    a second mold half having a second weld portion, the second weld portion aligned with the first weld portion to create a perimeter weld between the first sheet and the second sheet of the fluid-filled chamber when the first mold half and the second mold half are moved from an open state to a closed state; and
    a gate valve associated with one of the first mold half and the second mold half and including a weld portion aligned with the first weld portion and the second weld portion, the gate valve moveable relative to the one of the first mold half and the second mold half to create an inflation channel between the first sheet and the second sheet at the perimeter weld by separating one of the first sheet and the second sheet from the other of the first sheet and the second sheet.

2. The mold of claim 1, further comprising an inflation tube operable to provide pressurized fluid between the first sheet and the second sheet.

3. The mold of claim 2, wherein the inflation tube is positioned adjacent to and is in fluid communication with the inflation channel to permit pressurized fluid from the inflation tube to enter an area between the first sheet and the second sheet.

4. The mold of claim 2, wherein the inflation tube is positioned adjacent to and is in fluid communication with the inflation channel when the first mold half and the second mold half are in the closed state to permit pressurized fluid from the inflation tube to enter an area between the first sheet and the second sheet.

5. The mold of claim 1, wherein the first mold half and the second mold half are movable from the open state to the closed state to form the perimeter weld by applying pressure to the first sheet and the second sheet.

6. The mold of claim 1, wherein the gate valve is operable to move relative to the one of the first mold half and the second mold half when the first mold half and the second mold half are in the closed state to separate the one of the first sheet and the second sheet from the other of the first sheet and the second sheet.

7. The mold of claim 1, wherein the gate valve is operable to move away from the other of the first mold half and the second mold half when the first mold half and the second mold half are in the closed state to separate the one of the first sheet and the second sheet from the other of the first sheet and the second sheet.

8. The mold of claim 1, wherein the gate valve is operable to move toward the other of the first mold half and the second mold half to close the inflation channel by reattaching the first sheet and the second sheet at the inflation channel.

9. The mold of claim 1, wherein the other of the first mold half and the second mold half includes a cavity operable to receive the other of the first sheet and the second sheet upon inflation of the fluid-filled chamber.

10. The mold of claim 1, wherein the other of the first mold half and the second mold half includes at least one vacuum port operable to draw the other of the first sheet and the second sheet against a surface of the other of the first mold half and the second mold half.

11. A mold for forming a fluid-filled chamber formed from a first sheet and a second sheet, the mold comprising:
a first mold half having a first weld portion;
a second mold half having a second weld portion, the second weld portion aligned with the first weld portion to create a perimeter weld between the first sheet and the second sheet of the fluid-filled chamber when the first mold half and the second mold half are moved from an open state to a closed state; and
a gate valve associated with one of the first mold half and the second mold half and including a weld portion aligned with the first weld portion and the second weld portion, the gate valve operable in a first state to create an inflation channel by separating the first sheet and the second sheet at the perimeter weld when the first mold half and the second mold half are in the closed state and operable in a second state to close the inflation channel by reattaching the first sheet and the second sheet at the perimeter weld when the first mold half and the second mold half are in the closed state.

12. The mold of claim 11, further comprising an inflation tube operable to provide pressurized fluid between the first sheet and the second sheet.

13. The mold of claim 12, wherein the inflation tube is positioned adjacent to and is in fluid communication with the inflation channel to permit pressurized fluid from the inflation tube to enter an area between the first sheet and the second sheet.

14. The mold of claim 12, wherein the inflation tube is positioned adjacent to and is in fluid communication with the inflation channel when the first mold half and the second mold half are in the closed state to permit pressurized fluid from the inflation tube to enter an area between the first sheet and the second sheet.

15. The mold of claim 11, wherein the first mold half and the second mold half are movable from the open state to the closed state to form the perimeter weld by applying pressure to the first sheet and the second sheet.

16. The mold of claim 11, wherein the gate valve is operable to move away from the other of the first mold half and the second mold half when the first mold half and the second mold half are in the closed state to separate one of the first sheet and the second sheet from the other of the first sheet and the second sheet.

17. The mold of claim 11, wherein the gate valve is operable to move toward the other of the first mold half and the second mold half to close the inflation channel by reattaching the first sheet and the second sheet at the inflation channel.

18. The mold of claim 11, wherein the other of the first mold half and the second mold half includes a first cavity operable to receive one of the first sheet and the second sheet upon inflation of the fluid-filled chamber.

19. The mold of claim 18, wherein the one of the first mold half and the second mold half includes a second cavity operable to receive the other of the first sheet and the second sheet upon inflation of the fluid-filled chamber.

20. The mold of claim 11, wherein the other of the first mold half and the second mold half includes at least one vacuum port operable to draw one of the first sheet and the second sheet against a surface of the other of the first mold half and the second mold half.

* * * * *